(12) United States Patent
Day et al.

(10) Patent No.: US 9,260,918 B2
(45) Date of Patent: *Feb. 16, 2016

(54) METHODS FOR CONSTRUCTING UNDERGROUND BOREHOLE CONFIGURATIONS AND RELATED SOLUTION MINING METHODS

(71) Applicant: Sesqui Mining, LLC, Fort Collins, CO (US)

(72) Inventors: Roger L. Day, Rifle, CO (US); James A. Herickhoff, Fort Collins, CO (US)

(73) Assignee: Sesqui Mining LLC., Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/526,044

(22) Filed: Oct. 28, 2014

(65) Prior Publication Data

US 2015/0083499 A1    Mar. 26, 2015

Related U.S. Application Data

(63) Continuation of application No. 13/193,995, filed on Jul. 29, 2011, now Pat. No. 8,899,691, which is a continuation of application No. 12/566,446, filed on Sep. 24, 2009, now Pat. No. 8,057,765, which is a (Continued)

(51) Int. Cl.
*E21B 43/00* (2006.01)
*E21B 7/00* (2006.01)
(Continued)

(52) U.S. Cl.
CPC ... *E21B 7/00* (2013.01); *C01D 7/00* (2013.01); *C01D 7/126* (2013.01); *E21B 17/00* (2013.01); *E21B 33/12* (2013.01); *E21B 33/13* (2013.01); *E21B 43/281* (2013.01); *E21B 43/30* (2013.01)

(58) Field of Classification Search
USPC .......................................................... 299/2–6
See application file for complete search history.

(56) References Cited

U.S. PATENT DOCUMENTS 1,816,260 A * 7/1931 Lee ............................... 166/303
2,388,009 A   10/1945 Pike
(Continued)

OTHER PUBLICATIONS

"Directional Drilling," Schlumberger website, as early as Jul. 14, 2002, available at www.glossary.oilfield.slb.com/Display.cfm?Term=directional%20drilling, printed on Jun. 16, 2004, 1 page.

(Continued)

*Primary Examiner* — Sunil Singh
(74) *Attorney, Agent, or Firm* — Sheridan Ross P.C.

(57) ABSTRACT

Disclosed are methods for solution mining of evaporite minerals, such as trona, comprising drilling an access well and at least two lateral boreholes; injecting a fluid; circulating the fluid through the lateral boreholes with a controlled fluid flow; and collecting a pregnant solution. Also disclosed are methods of solution mining that include injecting an aqueous solution into an underground trona cavity at a temperature sufficient to maintain at least a portion of the solution in the cavity in the Wegscheiderite solid phase region; removing aqueous solution from the cavity; and recovering alkaline values from the removed aqueous solution. Also disclosed are methods of solution mining that include injecting an aqueous solution into an underground trona cavity; removing aqueous solution from the cavity, wherein the temperature of the removed aqueous solution is at about the TWA point temperature; and recovering alkaline values from the removed aqueous solution.

9 Claims, 11 Drawing Sheets

Related U.S. Application Data continuation of application No. 11/206,659, filed on Aug. 17, 2005, now Pat. No. 7,611,208.

(60) Provisional application No. 60/669,397, filed on Apr. 8, 2005, provisional application No. 60/615,941, filed on Oct. 6, 2004, provisional application No. 60/602,371, filed on Aug. 17, 2004, provisional application No. 60/602,372, filed on Aug. 17, 2004.

(51) Int. Cl.
*C01D 7/00* (2006.01)
*C01D 7/12* (2006.01)
*E21B 43/28* (2006.01)
*E21B 43/30* (2006.01)
*E21B 17/00* (2006.01)
*E21B 33/12* (2006.01)
*E21B 33/13* (2006.01)

(56) References Cited

U.S. PATENT DOCUMENTS

| | | |
|---|---|---|
| 2,625,384 A | 1/1953 | Pike et al. |
| 2,798,790 A | 7/1957 | Pike et al. |
| 2,847,202 A | 8/1958 | Pullen |
| 2,919,909 A | 1/1960 | Rule |
| 2,979,317 A | 4/1961 | Bays |
| 3,050,290 A | 8/1962 | Caldwell et al. |
| 3,058,730 A | 10/1962 | Bays |
| 3,083,760 A | 4/1963 | Wills |
| 3,119,655 A | 1/1964 | Frint et al. |
| 3,184,287 A | 5/1965 | Gancy |
| 3,254,921 A * | 6/1966 | Halsey ............ 299/2 |
| 3,264,057 A | 8/1966 | Miller |
| 3,273,958 A | 9/1966 | Peverley |
| 3,273,959 A | 9/1966 | Miller |
| 3,328,130 A | 6/1967 | Gancy |
| 3,510,167 A | 5/1970 | Carmody |
| 3,739,851 A | 6/1973 | Beard |
| 3,759,574 A | 9/1973 | Beard |
| 3,779,602 A | 12/1973 | Beard et al. |
| 3,792,902 A | 2/1974 | Towell et al. |
| 3,941,422 A | 3/1976 | Henderson |
| 3,953,073 A | 4/1976 | Kube |
| 3,983,939 A * | 10/1976 | Brown et al. ............ 166/269 |
| 4,222,611 A | 9/1980 | Larson |
| 4,232,902 A | 11/1980 | Cuevas |
| 4,285,915 A | 8/1981 | Saldick et al. |
| 4,288,419 A | 9/1981 | Copenhafer |
| 4,344,650 A | 8/1982 | Pinsky et al. |
| 4,384,614 A | 5/1983 | Justheim |
| 4,401,635 A | 8/1983 | Frint |
| 4,411,474 A | 10/1983 | Higgins |
| 4,418,960 A | 12/1983 | Higgins |
| 4,425,003 A | 1/1984 | Huff |
| 4,496,191 A | 1/1985 | Choi et al. |
| 4,498,706 A | 2/1985 | Ilardi et al. |
| 4,584,077 A | 4/1986 | Chlanda |
| 4,652,054 A | 3/1987 | Copenhafer |
| 4,753,485 A | 6/1988 | Goodhart |
| 4,785,882 A * | 11/1988 | Sprunt ............ 166/268 |
| 4,815,790 A | 3/1989 | Rosar et al. |
| H614 H | 4/1989 | Norman, Sr. |
| 5,043,149 A | 8/1991 | Frint et al. |
| 5,192,164 A | 3/1993 | Frint et al. |
| 5,238,664 A | 8/1993 | Frint et al. |
| 5,246,273 A | 9/1993 | Rosar |
| 5,262,134 A | 11/1993 | Frint et al. |
| 5,283,054 A | 2/1994 | Copenhafer et al. |
| 5,431,482 A | 7/1995 | Russo |
| 5,609,838 A | 3/1997 | Neuman et al. |
| 5,618,504 A | 4/1997 | Delling |
| 5,690,390 A | 11/1997 | Bithell |
| 5,766,270 A | 6/1998 | Neuman et al. |
| 5,955,043 A | 9/1999 | Neuman et al. |
| 6,047,774 A | 4/2000 | Allen |
| 6,228,335 B1 | 5/2001 | Copenhafer et al. |
| 6,251,346 B1 | 6/2001 | Neuman et al. |
| 6,322,767 B1 | 11/2001 | Neuman et al. |
| 6,428,759 B1 | 8/2002 | Smith et al. |
| 6,576,206 B2 | 6/2003 | Copenhafer |
| 6,576,209 B2 | 6/2003 | Tanaka et al. |
| 6,589,497 B2 | 7/2003 | Smith |
| 6,609,761 B1 | 8/2003 | Ramey et al. |
| 6,699,447 B1 | 3/2004 | Nielsen et al. |
| 6,854,809 B1 | 2/2005 | Ramey et al. |
| 7,611,208 B2 | 11/2009 | Day |
| 8,057,765 B2 | 11/2011 | Day et al. |
| 8,899,691 B2 * | 12/2014 | Day et al. ............ 299/5 |
| 2001/0001037 A1 | 5/2001 | Tanaka et al. |
| 2002/0009409 A1 | 1/2002 | Kunio et al. |
| 2002/0054842 A1 | 5/2002 | Copenhafer et al. |
| 2002/0192140 A1 | 12/2002 | Smith |
| 2003/0029617 A1 | 2/2003 | Brown et al. |
| 2004/0026982 A1 | 2/2004 | Ramey et al. |
| 2004/0108110 A1 | 6/2004 | Zupanick |
| 2004/0231109 A1 | 11/2004 | Nielsen et al. |
| 2005/0231022 A1 | 10/2005 | Brown et al. |

OTHER PUBLICATIONS

"Mining Methods," Pangea.Stanford.edu Website, as early as Feb. 24, 2001, available at pangea.stanford.edu/~kurt/tour/kurt-mining-methods.html, printed on Jun. 23, 2004, pp. 1-3.

Day, R., "Solution Mining of Colorado Nahcolite," Wyoming State Geological Survey Information Circular 40, 1998, pp. 121-130.

Day, R., "White River Nahcolite Solution Mine," Technical Paper, Society for Mining, Metallurgy, and Exploration, Preprint No. 94-210, Feb. 1994, pp. 1-4.

Dunn et al., "FMC's New Soda Ash Technology is a Success," Mining Engineering, Apr. 1999, pp. 25-28.

Fairchild et al., "A New Technology for the Soda Ash Deposits near Trona, California," Wyoming State Geological Survey Information Circular 40, 1998, pp. 143-152.

Frint, "FMC's Newest Goal: Commercial Solution Mining of Trona," Engineering and Mining Journal, Sep. 1985, pp. 26-35.

Garrett, D., "Solution Mining," Natural Soda Ash, Von Nostrand Reinhold, New York, NY, 1992, pp. 336-358.

Haynes, Jr. et al., "A Model for Solution Mining Trona," Wyoming State Geological Survey Information Circular 40, 1998, pp. 153-162.

Rosar, "Feasibility of Trona Solution Mining," Wyoming State Geological Survey Information Circular 40, 1998, pp. 131-142.

International Search Report for International (PCT) Patent Application No. PCT/US05/29415, mailed Aug. 22, 2006.

Written Opinion for International (PCT) Patent Application No. PCT/US05/29415, mailed Aug. 22, 2006.

International Preliminary Report on Patentability for International (PCT) Patent Application No. PCT/US05/29415, issued Feb. 20, 2007.

* cited by examiner

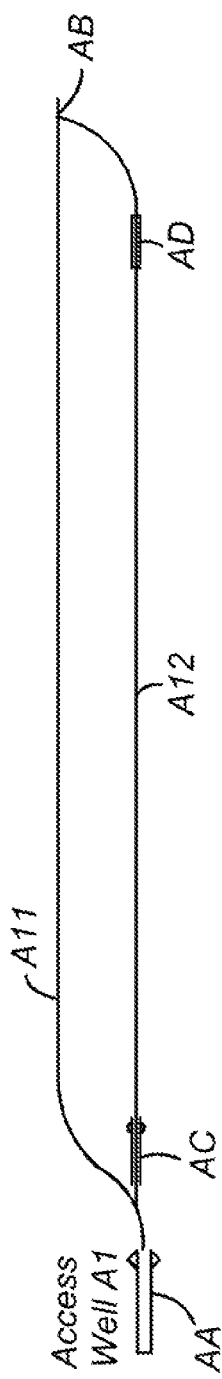
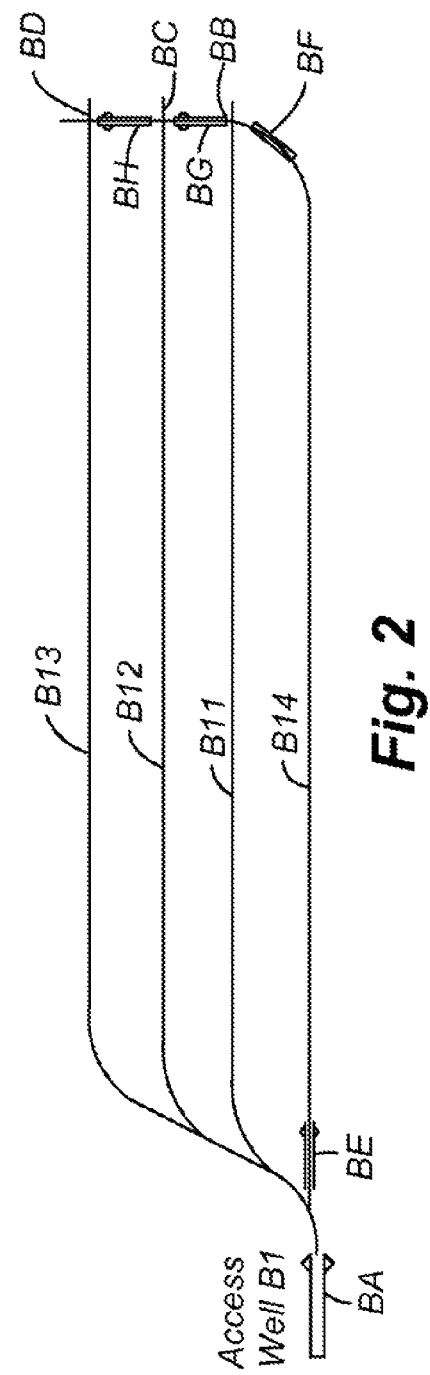

METHODS FOR CONSTRUCTING UNDERGROUND BOREHOLE CONFIGURATIONS AND RELATED SOLUTION MINING METHODS

The present application is a Continuation application of U.S. patent application Ser. No. 13/193,995, filed on Jul. 29, 2011, now U.S. Pat. No. 8,899,691, which is a Continuation application of U.S. patent application Ser. No. 12/566,446, filed on Sep. 24, 2009, now U.S. Pat. No. 8,057,765, which is a Continuation application of U.S. patent application Ser. No. 11/206,659, filed on Aug. 17, 2005, now U.S. Pat. No. 7,611,208, which claims priority of U.S. Provisional Patent Application No. 60/602,371 filed Aug. 17, 2004; U.S. Provisional Patent Application No. 60/602,372 filed Aug. 17, 2004; U.S. Provisional Patent Application No. 60/615,941 filed Oct. 6, 2004; and U.S. Provisional Patent Application No. 60/669,397 filed Apr. 8, 2005, all of which applications are hereby incorporated by reference in their entirety.

FIELD OF THE INVENTION

The present invention is directed to methods of constructing underground borehole configurations and to related methods of solution mining and production of commercial products. Underground borehole configurations include configurations for water wells and storage facilities for solids, liquids and/or gases. Mining methods of the present invention also relate to solution mining of soluble ore minerals and in situ production of other ores and energy yielding resources.

BACKGROUND OF THE INVENTION

Trona is a naturally occurring sodium sesquicarbonate ($Na_2CO_3 \cdot NaHCO_3 \cdot 2H_2O$). The Green River basin in southwestern Wyoming contains the world's largest known deposit of trona. Reserves in Wyoming amount to approximately 140 billion tons. In the Green River Basin there are approximately twenty-five beds of trona more than four feet thick with intervening strata of shale. These beds are encountered at a below surface depth between 500 and 3000 feet.

Trona is the principle source mineral for the United States soda ash industry and is generally produced by conventional underground mining methods. Mined ore is hoisted to the surface and is commonly processed into soda ash either by the 'sesquicarbonate process' or the 'monohydrate process.' In the sesquicarbonate process, the processing sequence involves underground mining; crushing; dissolving raw ore in mother liquor; clarifying; filtering; recrystallizing sodium sesquicarbonate by evaporative cooling; and converting to a medium density soda ash product by calcining. The monohydrate process involves underground mining, crushing; calcining of raw trona ore to remove carbon dioxide and some organics to yield crude soda ash; dissolving the crude soda ash; clarifying the resultant brine; filtering the hot solution; removing additional organics; evaporating the solution to crystallize sodium carbonate monohydrate; and drying and dehydrating sodium carbonate monohydrate to yield the anhydrous soda ash product.

Solution mining of trona has been proposed to minimize environmental impacts and reduce or eliminate the costs of underground mining, hoisting, crushing, calcining, dissolving, clarification, solid/liquid/vapor waste handling and environmental compliance. The numerous salt (NaCl) solution mines operating throughout the world exemplify solution mining's potential low cost and environmental impact. Attempts to solution mine trona using vertical boreholes began soon after the 1940's discovery of trona in the Green River Basin in Wyoming. U.S. Pat. No. 3,050,290 discloses a process for solution mining of trona that suggests using a mining solution at a temperature of the order of 100° C.-200° C. This process requires the use of recirculating a substantial portion of the mining solution removed from the formation back through the formation to maintain high temperatures of the solution. A bleed stream from the recirculated mining solution is conducted to a recovery process during each cycle and replaced by water or dilute mother liquor. U.S. Pat. No. 3,119,655 discloses a process for the recovery of soda ash from trona and recognizes that trona can be recovered by solution mining. This process includes introduction of water heated to about 130° C. and recovery of a solution from the underground formation at 90° C.

These solution-mining attempts failed to mature. Instead, large-scale traditional underground mines were developed with combined capacity in excess of 17,000,000 tons per year. The most recent borehole trona solution mine attempt involved connecting multiple conventionally drilled vertical wells along the base of a preferred trona bed. Hydraulic fracturing was used to connect the wells. FMC Corp. was the primary company attempting to develop such trona solution mining. FMC staff published a report (E&MJ September 1985 "FMC's Newest Goal: Commercial Solution Mining Of Trona" including "Past attempts and failures") promoting the hydraulic fracture well connection of well pairs as the new development that would commercialize trona solution mining. The application of hydraulic fracturing for trona solution mining was found to be unreliable. Fracture communication attempts failed in some cases and in other cases gained communication but not in the desired manner. The fracture communication project was abandoned in the early 1990's. Such hydraulic fracturing of trona has been proposed, claimed or discussed in numerous patents such as U.S. Pat. No. 2,847,202 (Pullen); U.S. Pat. No. 2,919,909 (Rule), among others.

At the present time, trona from the Green River basin is mainly produced by conventional mining methods described above, however, as part of a underground tailings disposal projects, operators have flooded old workings, dissolving the pillars and recovering the dissolved sodium value. This process was pioneered by FMC and described by their staff in the April 1999 E&MJ article "FMC's New Soda Ash Technology Is A Success". The tailings disposal slurry deposits the solids in the old underground workings and the clarified solution dissolves some of the trona remaining in the mine pillars. The solution is then pumped to surface and evaporated, steam stripped to convert some of the bicarbonate to carbonate in solution, the remaining bicarbonate ions are converted to carbonate by a lime reaction, a solid phase soda ash decahydrate is recovered and the depleted solution is returned to the underground tailings disposal system. The soda ash decahydrate becomes an alternative feed stock to the existing monohydrate process plant providing the commercial soda ash products. This process is described in U.S. Pat. No. 5,283,054 issued in February 1994 to Copenhafer, Smith and Niedringhans. Individually, the process steps of this patent (evaporation to concentrate the solutions, steam stripping to convert some of the bicarbonate to carbonate, lime process (hydroxide process) conversion of the remaining bicarbonate ions to carbonate and the decahydrate process to recover soda ash values) are well-known processes.

Directional drilling from the ground surface has been used to connect dual wells for solution mining bedded evaporite deposits and the production of sodium bicarbonate, potash and salt. Directional drilling is used for solution mining bedded nahcolite deposits (naturally occurring sodium bicarbonate) and is described in Day, R. 1994 "White River Nahcolite Solution Mine," *Society for Mining, Metallurgy, and Exploration Meeting and Exhibit*, February 1994, Albuquerque, N. Mex. Development of nahcolite solution mining cavities by using directionally drilled horizontal holes and vertical drill wells is described in U.S. Pat. No. 4,815,790, issued in 1989 to E. C. Rosar and R. Day, entitled Nahcolite Solution Mining Process and in United States Statutory Invention Registration No. H614, entitled "Method to Connect Drill Holes Utilizing Signaling Devices" to Robert Norman. The use of directional drilling for trona solution mining is described in U.S. Patent Application Publication No. US 2003/0029617 entitled "Application, Method and System For Single Well Solution Mining" by N. Brown and K. Nesselrode.

However, most trona deposits occur in narrow layered beds where the resource is disposed in beds that extend primarily horizontally with discrete boundaries of nonsoluble or non-evaporite rock disposed in between the beds. This bed configuration is costly to mine by conventional mining methods but this remains the dominant trona mining method. The practice of solution mining pillars does not materially improve the overall high soda ash production cost due to the high cost initial trona mining. There has been no known experimental or commercial activity to apply the directional drilling solution-mining methods known to the art.

Trona and nahcolite are the principle source minerals for the United States sodium bicarbonate industry. Sodium bicarbonate is produced by water dissolution and carbonation of either mechanically mined trona ore or the soda ash produced from that ore. Sodium bicarbonate is also produced by solution mining nahcolite, the naturally occurring form of sodium bicarbonate. Nahcolite solution mining utilizes directionally drilled boreholes and a hot aqueous solution comprised of dissolved soda ash, sodium bicarbonate and salt. In either case, the sodium bicarbonate is produced by cooling or a combination of cooling and evaporative crystallization.

Uranium mining is often by in situ leach methods (also known as solution mining). Uranium deposits, suitable for solution mining, generally occur in permeable sandstones, confined above and below by impermeable strata and below the water table. A wellfield design is typically a grid with alternating production and injection wells drilled vertically from surface. The well grid is typically drilled such that there is a borehole, drilled from the surface, in a center position. Fluid is injected into the permeable strata from this center borehole. Ranged around the center borehole are a number of boreholes, also drilled from the surface, from which fluid that has passed through the permeable strata is collected and recovered. This fluid contains dissolved uranium minerals that may then be recovered.

However, there remains a need in the art for improved methods of solution mining for evaporite minerals, in particular trona, and improved methods of solution mining non-evaporite soluble ores such as those containing uranium, and improved methods of producing coal, tar sands, heavy oil and oil shale. There remains a need in the art for solution mining methods that enhance resource recovery from evaporite mineral or ore beds, allow for recovery of a solvent that is rich in desired dissolved minerals and lean in undesired dissolved minerals leading to more cost effective winning of commercial products from the solvent, and reduced environmental impacts compared to conventional underground mining. There also remains a need in the art for underground configurations which allow for efficient storage and/or disposal of solids, gases and/or liquids; water wells; and containment systems/recovery systems for plumes of underground contaminants as well as for production of shale oil, heavy oils, tar sands and enhanced recovery from depleted conventional oil fields.

SUMMARY OF THE INVENTION

One embodiment of the present invention is a method for solution mining of an evaporite mineral. The method includes drilling at least one access well accessing an evaporite mineral formation. The method further includes drilling at least two lateral boreholes, wherein the lateral boreholes communicate with each other and at least one of the lateral boreholes is connected with the access well. A fluid is injected into the access well and the fluid is circulated through the access well and the two lateral boreholes, wherein substantially equal or controlled fluid flow is maintained between the lateral boreholes. A pregnant solution containing the dissolved evaporite mineral is collected. The access well can either include a single access well or two or more access wells. In the embodiment where there are two access wells, the two lateral boreholes can be connected to the access wells at a single, multiply connected point. In further alternative embodiments, the lateral boreholes can include 3, 4, 5 or 6 lateral boreholes. Further, the ratio of lateral boreholes to access wells can be greater than or equal to 1:1, 2:1, 3:1 or 4:1.

The lateral boreholes can be disposed substantially vertically with respect to each other or substantially horizontally with respect to each other.

In a further embodiment, the mining configuration can include a first and second access well, wherein fluid is injected into the first access well and the step of collecting a pregnant solution includes collecting the solution from the second access well.

The access well can also include tubing that is inserted into the access well. In this embodiment, the access well can also include a packer. Further, the fluid can exit the tubing at the shoe of the access well or it can exit the tubing within a lateral borehole. In this embodiment, the step of injecting a fluid into the access well can include injecting the fluid from more than one tubing inserted into the access well.

The step of collecting a pregnant solution can include collecting the pregnant solution at the shoe of the well. Further, the step of collecting can include collecting a pregnant solution with at least one tubing placed within an access well. The access well can be cased and cemented for at least a part of the length of the borehole.

The lateral boreholes can be created by a method that includes drilling a first lateral borehole in a first direction having a forward end on a first plane; reciprocating the drill from the forward end of the first lateral borehole to expand the first lateral borehole to include the second plane; and drilling a second lateral borehole in the second plane.

The step of circulating a fluid can include flowing the fluid through the lateral boreholes in parallel, and can also include flowing the fluid through the lateral boreholes serially. In the case of a serial fluid flow, at lease one plug can be placed in the lateral borehole. The lateral boreholes can be between about 25 feet and 750 feet in distance from each other.

The evaporite mineral can be selected from halite, carbonate, nitrate, iodate, borate, sulfate, and phosphate. In other embodiments, the evaporite mineral can be selected from trona, nahcolite, halite, potash, borax, mirabuiulite, sylvite, carnalite, kalinite, nitire, langbeinite, polyhalite, schoenite, thenardite, gaylussite, pirssonite, and Wegscheiderite. In a preferred embodiment, the evaporite mineral is trona.

The fluid in the method can be a solvent, and the solvent can include species selected from carbonic acid, sodium carbonate, sodium hydroxide and calcium hydroxide. Additionally, the solvent can be heated, such as to be between about 20° C. and about 110° C.

The method can further include placing an artificial leach barrier within at least one lateral borehole to control the leach rate and direction of the evaporite minerals from within the borehole. Further, the method can include drilling at least one of the lateral boreholes such that a natural barrier controls the leach rate in the direction of the evaporite minerals from within the borehole. In this embodiment, the natural barrier can lie between the two lateral boreholes. Further, in this embodiment, the two lateral boreholes can be disposed substantially vertically with respect to each other, and the upper lateral borehole can be substantially completely solution mined before the lower lateral borehole is substantially completely solution mined. Further, the natural barrier can either be an interbed natural barrier or an intrabed natural barrier.

A further embodiment of the invention includes a method for solution mining of an evaporite mineral. This method includes drilling at least one access well accessing an evaporite mineral formation and drilling at least two lateral boreholes, wherein the lateral boreholes communicate with each other and at least one of the lateral boreholes is connected to the access well. The method further included injecting a fluid into the access well and circulating the fluid through the access well and the two lateral boreholes in a serpentine flow pattern. The method further includes collecting a pregnant solution containing at least one dissolved evaporite mineral.

The access well can either include a single access well or two or more access wells. In the embodiment where there are two access wells, the two lateral boreholes can be connected to the access wells at a single, multiply connected point. In further alternative embodiments, the lateral boreholes can include 3, 4, 5 or 6 lateral boreholes. Further, the ratio of lateral boreholes to access wells can be greater than or equal to 1:1, 2:1, 3:1 or 4:1.

The lateral boreholes can be disposed substantially vertically with respect to each other or substantially horizontally with respect to each other.

In a further embodiment, the mining configuration can include a first and second access well, wherein fluid is injected into the first access well and the step of collecting a pregnant solution includes collecting the solution from the second access well.

The access well can also include tubing that is inserted into the access well. In this embodiment, the access well can also include a packer. Further, the fluid can exit the tubing at the shoe of the access well or it can exit the tubing within a lateral borehole. In this embodiment, the step of injecting a fluid into the access well can include injecting the fluid from more than one tubing inserted into the access well.

The step of collecting a pregnant solution can include collecting the pregnant solution at the shoe of the well. Further, the step of collecting can include collecting a pregnant solution with at least one tubing placed within an access well. The access well can be cased and cemented for at least a part of the length of the borehole.

The lateral boreholes can be created by a method that includes drilling a first lateral borehole in a first direction having a forward end on a first plane; reciprocating the drill from the forward end of the first lateral borehole to expand the first lateral borehole to include the second plane; and drilling a second lateral borehole in the second plane.

The step of circulating a fluid can include flowing the fluid through the lateral boreholes in parallel, and can also include flowing the fluid through the lateral boreholes serially. In the case of a serial fluid flow, at lease one plug can be placed in the lateral borehole. The lateral boreholes can be between about 25 feet and 750 feet in distance from each other.

The evaporite mineral can be selected from halite, carbonate, nitrate, iodate, borate, sulfate, and phosphate. In other embodiments, the evaporite mineral can be selected from trona, nahcolite, halite, potash, borax, mirabuiulite, sylvite, carnalite, kalinite, nitire, langbeinite, polyhalite, schoenite, thenardite, gaylussite, pirssonite, and Wegscheiderite. In a preferred embodiment, the evaporite mineral is trona.

The fluid in the method can be a solvent, and the solvent can include species selected from carbonic acid, sodium carbonate, sodium hydroxide and calcium hydroxide. Additionally, the solvent can be heated, such as to be between about 20° C. and about 110° C.

The method can further include placing an artificial leach barrier within at least one lateral borehole to control the leach rate and direction of the evaporite minerals from within the borehole. Further, the method can include drilling at least one of the lateral boreholes such that a natural barrier controls the leach rate in the direction of the evaporite minerals from within the borehole. In this embodiment, the natural barrier can lie between the two lateral boreholes. Further, in this embodiment, the two lateral boreholes can be disposed substantially vertically with respect to each other, and the upper lateral borehole can be substantially completely solution mined before the lower lateral borehole is substantially completely solution mined. Further, the natural barrier can either be an interbed natural barrier or an intrabed natural barrier.

A further embodiment of the present invention includes a method for solution mining of an evaporite mineral that includes drilling at least one access well into an evaporite mineral formation and drilling a first and second lateral borehole into the formation that communicate with each other, wherein at least one of the lateral boreholes is connected to the access well. The method further includes injecting a fluid into the access well, circulating it through the first lateral borehole to produce a first pregnant solution containing a dissolved evaporite mineral to produce a first cavity, and collecting the first pregnant solution. The method further includes circulating a fluid through the second lateral borehole to produce a second pregnant solution containing a dissolved evaporite mineral to produce a second cavity, and collecting the second pregnant solution. In this embodiment, the step of circulating the fluid to the second lateral borehole can be initiated after the step of circulating the fluid through the first lateral borehole, when the first lateral borehole is below the second lateral borehole. In this embodiment, a barrier between the first cavity and the second borehole can collapse to open a communication between the first cavity and the second borehole.

A further embodiment of the present invention, includes a method for solution mining of an evaporite mineral that includes drilling first and second access wells extending into an evaporite mineral formation and drilling first and second substantially parallel lateral boreholes, wherein second ends of the lateral boreholes communicate and wherein the first end of the first lateral borehole communicates with the first access well and the first end of the second lateral borehole communicates with the second access well. The method further includes injecting a fluid into the first access well and collecting a pregnant solution containing a dissolved evaporite mineral from the second access well. This embodiment can also include injecting a fluid into a second well and collecting a pregnant solution containing dissolved evaporite minerals from the first access well. In this embodiment, the first lateral borehole can contain at least one first access tubing and the second lateral borehole can contain at least one second access tubing. This embodiment further comprises injecting a fluid into the first access tubing and collecting a pregnant solution containing a dissolved evaporite mineral from the second access well. This embodiment can also include injecting a fluid into a second access tubing and collecting a pregnant solution containing a dissolved evaporite mineral from the first access tubing. In further embodiments of the invention, the lateral boreholes can communicate via first intermediate positions on each lateral borehole between the first and second ends of each lateral borehole. Further, the lateral boreholes can also communicate via second intermediate positions on each lateral borehole between the first and second ends of each lateral borehole.

A further embodiment of the present invention includes a method for solution mining of an evaporite mineral that includes drilling at least two access wells extending into an evaporite mineral formation and drilling a first array of at least two substantially parallel lateral boreholes. The method further includes drilling a second array of at least two substantially parallel lateral boreholes. In this embodiment, the boreholes in the first array are not parallel with the boreholes in the second array and the boreholes in the first and second arrays communicate with at least one borehole in the other array or with an access well. The method further includes injecting a fluid into at least one of the access wells and collecting a pregnant solution containing a dissolved evaporite mineral from at least one of the access wells. This embodiment can further include drilling a third array of at least two substantially parallel lateral boreholes wherein the boreholes in each of the arrays are not parallel with the boreholes in any other array and wherein the boreholes in the first, second and third arrays communicate with at least one borehole in another array or with an access well.

A further embodiment of the present invention is a method for solution mining of an ore mineral formation. The method includes drilling at least one access well accessing the ore mineral formation and drilling at least two lateral boreholes, each containing a first end connected to the access well and a second end not in borehole communication with the access well or another lateral borehole. The method includes injecting the fluid into the access well causing fluid flow within the ore mineral formation and collecting a pregnant solution containing a recovered ore mineral from at least one lateral borehole. In a preferred embodiment, the ore mineral can include uranium. In a further embodiment, at least a portion of the lateral boreholes are substantially parallel to each other. In a still further embodiment, at least a portion of the lateral boreholes and the access well are substantially parallel to each other. Alternatively, at least a portion of the lateral boreholes in the access well can be drilled such that a substantial portion of the boreholes are substantially perpendicular with respect to the ground surface. In this embodiment, at least one access well can comprise a single access well. Further, the two lateral boreholes can be connected to the access well at a single multiply connected point. The lateral boreholes can include at least 3, at least 4, at least 5, or at least 6 lateral boreholes. The step of injecting a fluid into the access well can include injecting the fluid into at least one tubing inserted into the access well. The step of collecting a pregnant solution containing a dissolved ore mineral can include collecting the solution at the shoe of the well. The step of collecting a pregnant solution can include collecting the solution with at least one tubing placed within the access well. The communicating lateral boreholes can be created by a method that includes drilling a first lateral borehole in a first direction having a forward end on a first plane. The method further includes reciprocating the drill from the forward end of the first lateral borehole to expand the first lateral borehole to include a second plane, and drilling a second lateral borehole in the second plane. The fluid used in this method can include a solvent.

A further embodiment of the present invention includes the method of constructing an underground configuration that includes drilling at least one access well and drilling at least two lateral boreholes. The two lateral boreholes communicate with each other and at least one of the lateral boreholes is connected to the access well. Further, the underground configuration allows for controlled fluid flow through the lateral boreholes. The underground configuration can be a water well, an evaporite ore mine, an oil shale mine, a tar sand mine, or a coal mine. Further, the underground configuration can be a containment barrier for underground contaminants. The underground can also be a subterranean storage facility such as a storage facility for a gas such as natural gas or for a liquid.

A further embodiment of the present invention is a method of solution mining of trona. The method includes injecting an aqueous solution into an underground cavity comprising trona to dissolve the trona. The injected aqueous solution comprises condensed steam produced by the evaporation of water from a solution to produce a sodium product. Further, the injected aqueous solution is at a temperature sufficient to maintain at least a portion of the solution in the cavity in the Wegscheiderite solid phase region. The method further includes removing aqueous solution from the cavity and recovering alkaline values from the removed aqueous solution. The temperature of the removed aqueous solution can be within the Wegscheiderite solid phase region, or it can be about 90° C., about 120° C., about 150° C., about 180° C., about 210° C., or about 240° C. In addition, the temperature of the removed aqueous solution can be at about the TWA point temperature. The removed aqueous solution can also include sodium bicarbonate and sodium carbonate at concentrations that are greater than about 75% of their maximum solubility, greater than about 80% of maximum solubility, greater than about 85% of maximum solubility, greater than about 90% of maximum solubility, greater than about 95% of maximum solubility, or greater than about 99% of maximum solubility. Further, the temperature of the removed aqueous solution can be in the range of about 115° C. to about 120° C., from about 110° C. to about 145° C., from about 105° C. to about 170° C., from about 100° C. to about 190° C., or from about 90° C. to about 240° C.

In a further embodiment, the sodium product can be selected from sodium sesquicarbonate, sodium bicarbonate, sodium carbonate monohydrate and anhydrous sodium carbonate. The step of recovering can also comprise recovering sodium carbonate monohydrate by evaporating water from the removed aqueous solution to produce steam and condensing the steam. In this embodiment, the condensed steam in the aqueous solution can be the steam condensed by the step of recovering.

The removed solution can be enriched in sodium bicarbonate and sodium carbonate. Further, the removed solution can be treated to form sodium bicarbonate, sodium sesquicarbonate, sodium carbonate monohydrate or anhydrous sodium carbonate. In a preferred embodiment, the removed solution is treated to form sodium bicarbonate by carbonating the removed solution. Further, the removed solution can be treated to form sodium sesquicarbonate.

The step of treating can include a step selected from cooling, evaporative crystallization and combinations thereof. The method can also include recovering sodium carbonate monohydrate from the removed solution. In this embodiment, the process can further include a step prior to recovering sodium carbonate monohydrate that is selected from fortification, steam stripping, evaporation, the hydroxide process and sodium carbonate decahydrate process. The process of this embodiment can also include introducing $Ca(OH)_2$ to the aqueous solution, whereby calcium carbonate is formed and settles from the aqueous solution in the cavity. Alternative, $Ca(OH)_2$ can be introduced to the removed aqueous solution, whereby calcium carbonate is formed and settles from the aqueous solution. In this embodiment, the process can further include introducing the calcium carbonate into an underground cavity.

A further embodiment of the present invention includes a method of solution mining of trona. The method includes injecting an aqueous solution into an underground cavity that comprises trona to dissolve the trona. The process further includes removing aqueous solution from the cavity, wherein the temperature aqueous solution is at about the TWA point temperature. The process further includes recovering alkaline values from the removed aqueous solution.

In this embodiment, sodium bicarbonate and sodium carbonate concentrations in the removed aqueous solution can be at greater than about 75%, about 80%, about 85%, about 90%, about 95%, or about 99% of the maximum solubility. Further, the temperature of the removed aqueous solution can be in the range of about 115° C. to about 120° C., from about 110° C. to about 145° C., from about 105° C. to about 170° C., from about 100° C. to about 190° C., from about 90° C. to about 240° C.

Further, the aqueous solution can comprise condensed steam produced by evaporation of water from the solution to produce sodium products. In this embodiment, the sodium products can be selected from sodium sesquicarbonate, sodium bicarbonate, sodium carbonate monohydrate and anhydrous sodium carbonate. Further, in this embodiment, the step of recovering can include recovering sodium carbonate monohydrate by evaporating water from the removed aqueous solution to produce steam and condensing steam. Further, the condensed steam in the aqueous solution can be the steam condensed by the step of recovering.

In further embodiments, the removed solution can be enriched in sodium bicarbonate and sodium carbonate. Further, the removed solution can be treated to form sodium bicarbonate, sodium sesquicarbonate, sodium carbonate monohydrate or anhydrous sodium carbonate. In particular, the removed solution can be treated to form sodium bicarbonate by carbonating the removed solution. Alternatively, the removed solution can be treated to form sodium sesquicarbonate. The step of treating can include a step selected from the group consisting of cooling, evaporative crystallization and combinations thereof. Sodium carbonate monohydrate can be recovered from the removed solution and prior to recovering sodium carbonate monohydrate, the solution can be treated by a step selected from fortification, steam stripping, evaporation, the hydroxide process, and the sodium carbonate decahydrate process.

The process can further include introducing $Ca(OH)_2$ to the aqueous solution whereby calcium carbonate is formed and settles from the aqueous solution in the cavity. Alternatively, $Ca(OH)_2$ can be introduced to the removed aqueous solution whereby calcium carbonate is formed and settles from the aqueous solution. In this embodiment, the calcium carbonate can be introduced into an underground cavity.

In further embodiments, during the dissolution of trona, Wegscheiderite and/or nahcolite are precipitated from the mining solution in the cavity. In this embodiment, the method is conducted until the cavity becomes effectively depleted of trona. This process further includes injecting an aqueous solution into the cavity comprising precipitated Wegscheiderite and/or nahcolite to dissolve these minerals. The aqueous solution is removed from the cavity and alkaline values are recovered from the removed aqueous solution. In this embodiment, the temperature of the removed aqueous solution can be above the temperature at which sodium decahydrate can exist. Alternatively, the temperature of the removed aqueous solution can be within the Wegscheiderite solid phase region. Further, the temperature of the removed aqueous solution can be above about 30° C. Alternatively, the temperature of the removed aqueous solution can be between about 90° C. and about 150° C.

BRIEF DESCRIPTION OF THE FIGURES

FIG. 1 illustrates an underground configuration of the present invention having one access well and two lateral boreholes.

FIG. 2 illustrates an underground configuration of the present invention having one access well and four lateral boreholes.

DETAILED DESCRIPTION OF THE INVENTION

Figure 3:
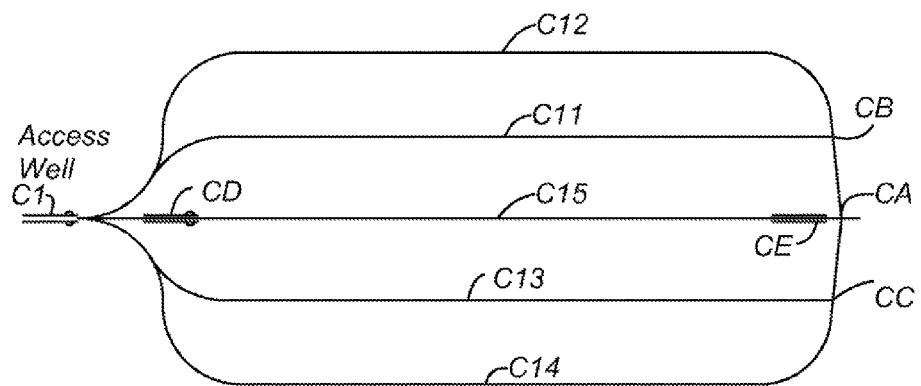
FIG. 3 illustrates an underground configuration of the present invention having one access well and five lateral boreholes designed for parallel flow within the lateral boreholes.

The present invention generally relates to methods of constructing underground borehole configurations and related commercial opportunities. More particularly, the present invention relates to constructing underground borehole configurations, solution mining of soluble ores, recovery of underground resources of water, underground contaminate cleanup or containment, and in situ production of oil shale, coal, heavy oil and otherwise depleted conventional oil. The present invention, more specifically, provides a process to optimize the solution mining of trona using both improved methods to construct underground borehole configurations and improved methods to dissolve the ore and produce commercial products.

This invention teaches the construction of improved borehole configurations including efficiently drilled multiple branched laterals and methods to favorably direct the flow of solutions and control the dissolution in the multiple branched borehole system to cause the development of highly productive solution mined cavity and process.

This invention further teaches the improved means to recover highly concentrated solutions that are enriched in $CO_3$ and depleted in less desirable $HCO_3$.

Over the years much has been made of incongruent and congruent dissolving of trona in aqueous solutions. U.S. Pat. No. 5,283,054 provides an example of congruent and incongruent concepts common in the industry. Such concepts are not true. Trona's crystal structure is unique. While trona contains the building blocks to make soda ash and sodium bicarbonate, solid phase soda ash and sodium bicarbonate do not exist in trona.

Trona does not leach—it dissolves. When it dissolves, the resulting solution contains sodium ions, carbonate ions, bicarbonate ions, and water. The dissolution process progresses until the solution is saturated. In the case of trona dissolution in water at temperatures of the nahcolite solid phase region, the sodium bicarbonate related ions become saturated before the soda ash related ions. In this case, trona dissolution continues until both the soda ash and bicarbonate related ions are saturated. This is the condition commonly referred to as being "double saturated" in the industry. In reaching the double saturated condition, excess sodium bicarbonate in solution supersaturates and may precipitate. When precipitating, solid phase sodium bicarbonate may occur at the trona dissolution surface as experienced in the lab and small-scale trona dissolution tests. This type of precipitation need not be the case in commercial trona solution mining where conditions can be controlled to cause localized higher supersaturation and precipitation in areas remote from the most productive trona dissolution areas. Such sodium bicarbonate precipitation within the cavity occurs as the trona continues to dissolve and the soda ash related ions continue to increase in concentration. This process results in solutions that are concentrated with the soda ash related ions and depleted in the sodium bicarbonate related ions. Such solutions are preferred in the industry for the production of soda ash. In the case of trona dissolution in water at temperatures within the Wegscheiderite solid phase region, in a process similar to that described above, Wegscheiderite can precipitate as trona dissolves. Also in a similar manner, in the case of Wegscheiderite dissolving in water at temperatures of the Wegscheiderite solid phase region, nahcolite can precipitate as the Wegscheiderite dissolves.

A second beneficial precipitation of Wegscheiderite and sodium bicarbonate can occur when the cavity contacts bedded salt (NaCl). Salt dissolution rapidly causes high localized Wegscheiderite and sodium bicarbonate supersaturation and precipitation at the contact of the solution and salt. Experience shows that the resulting sodium bicarbonate precipitation occurs at the face of the exposed salt. This effect (1) slows the salt dissolution rate and (2) removes less desirable Wegscheiderite and sodium bicarbonate from the solution in a preferred location that enhances the commercial dissolution of the trona ore.

Trona dissolves instead of preferentially leaching various portions of the trona. At 40° C., water dissolving trona in the sodium bicarbonate solid phase region of FIG. 14 becomes sodium bicarbonate saturated at Point A'. As trona dissolution continues, it causes the solution chemistry to move along the constant 40° C. temperature line toward the trona solid phase region until becoming double saturated at point D. At this point, trona dissolution stops as both the soda ash related ions and sodium bicarbonate related ions are at saturation with trona in the solid phase. The phase diagram demonstrates that heating the ore cavity while dissolving trona in the sodium bicarbonate solid phase region in contact with the trona solid phase region increases the concentration of the less desirable sodium bicarbonate but could even cause the desired soda ash concentration to decline. One aspect of the present invention uses an elevated temperature dissolution process to dissolve trona while in the Wegscheiderite solid phase region of the phase diagram to gain a highly concentrated solution that, relative to the composition of trona, is rich in the desirable soda ash and depleted in respect to sodium bicarbonate. A preferred result is the recovery of solution that approaches the temperature and composition of the triple point identified as TWA on the phase diagram in FIG. 14. Thus, the TWA point refers to a solution in which Trona, Wegscheiderite, and Anhydrous sodium carbonate coexist. The TWA point refers to a point in the Wegscheiderite solid phase region where sodium carbonate and sodium bicarbonate are at about maximum solubility. This phase diagram shows the TWA point at about 115° C. Other published phase diagrams identify the TWA point at 122° C. Solvent impurities such as salt will lower the temperature and composition of the TWA point.

Recovered trona mining solutions approaching the concentration and nature of point TWA on the phase diagram are uniquely suited for the economic production of either or both sodium bicarbonate and sodium sesquicarbonate. Cooling or a combination of cooling and evaporative crystallization of the TWA solution produces sodium sesquicarbonate. Carbonating the TWA solution by addition of carbon dioxide to the solution before either cooling and/or evaporative crystallization produces sodium bicarbonate. The sesquicarbonate and bicarbonate production can also be accomplished in series as well as in parallel. In any case, the soda ash values remaining in solution following removal of the solid phase sodium sesquicarbonate and sodium bicarbonate products, can be recovered using well-known processes such as the monohydrate soda ash process. The sodium sesquicarbonate and sodium bicarbonate depleted solutions can directly feed the monohydrate crystallizers or be pretreated using the well-known fortification, steam stripping, decahydrate process (cooling a sodium carbonate solution to between about 5° C. and about 25° C. to precipitate sodium carbonate decahydrate) and hydroxide process (described below). In any case, the monohydrate process provides preheated water (condensed steam) for injection to the cavity creating a highly energy efficient closed loop system.

As noted, during the solution mining of trona in accordance with the invention, the mining solution, relative to the composition of trona, is rich in desirable soda ash and depleted in respect to sodium bicarbonate. Since the solution is saturated with nahcolite or Wegscheiderite, as more trona is dissolved, the sodium bicarbonate is preferentially removed in the form of Wegscheiderite or nahcolite depending on the solid phase region of the system. Thus, during the mining of the trona resource, a significant amount of Wegscheiderite or nahcolite can be produced in the mining cavity. As mining progresses, the mining cavity becomes effectively depleted of trona, either by the mining face reaching another mineral such as shale or by mud production that covers the cavity floors and sloped walls, blinding the trona surfaces from the mining solution. At that point, fresh mining solution will contact the significant amount of precipitated Wegscheiderite and nahcolite produced by the trona mining. This process further includes continued solution mining at temperatures of the Wegscheiderite or nahcolite solid phase regions, recovering additional sodium values from the cavity using the processes and producing the products in a manner similar to those of this invention for the TWA solutions from a trona dominated solution mining system. A preferred recovery temperature for this phase of mining is at about the temperature of the WTN (Wegscheiderite-Trona-Nahcolite) triple point where all minerals can coexist in solid phase. In the pure system depicted by the phase diagram FIG. 14, this preferred recovered solution would be about 90° C., 17% soda ash and 10% sodium bicarbonate.

The present invention also teaches more cost effective methods of using lime in the process or cavity, if needed or desired, including the disposal of lime process waste in the cavities to reduce the cost and environmental impacts.

The improved borehole configuration of the present invention optimizes trona solution mining by cost-effectively increasing the borehole length and dissolution surface available per well, optimizing borehole positioning within a single bed or in a multiple bed system, controlling solution flow patterns within the borehole system and achieving highly concentrated solutions.

The present invention relates to improved borehole construction, the recovery of more concentrated trona solution mining solutions and lime process improvements for the production of sodium products. Included in the patent is the previously undiscovered use of these inventions in combination with well known sodium mineral processing and production of sodium products including without limitation—fortification, steam stripping, carbonation, sodium sesquicarbonate process, sodium carbonate process, sodium decahydrate process, sodium monohydrate process, hydroxide process, carbonic acid, etc.

The methods of the present invention provide for improved solution mining of both evaporite minerals, such as trona, and soluble ore minerals, such as uranophane. The methods of the present invention provide for more economically efficient solution mining. Benefits include reduced environmental impacts, enhanced resource recovery, more efficient solution mining of evaporite beds, reduced drilling costs, and recovered solutions rich in desired dissolved minerals and lean in undesired dissolved minerals, leading to winning of commercial products from these solutions. The methods of the present invention also provide for improved underground configurations for more efficient storage and/or disposal of gases and/or liquids; underground configurations for water wells; and containment and/or recovery systems for plumes of underground contaminants.

In a first embodiment, the present invention includes a method for solution mining of an evaporite mineral which includes drilling at least one access well accessing an evaporate mineral formation and drilling at least two lateral boreholes, wherein the lateral boreholes communicate with each other and wherein at least one of the lateral boreholes is connected to the access well. The method also includes injecting a fluid into the access well and circulating the fluid through the access well and the lateral boreholes wherein controlled fluid flow is maintained between at least two lateral boreholes. Finally, the method includes collecting a pregnant solution containing a dissolved evaporite mineral.

The term solution mining refers to the dissolution and recovery of minerals from an underground mineral deposit generally using wells drilled from the ground surface. Water-soluble minerals that are susceptible to solution mining techniques include evaporite minerals. Evaporite minerals include all minerals that were precipitated from solutions concentrated by evaporation of solvents. Evaporite minerals susceptible to solution mining by methods of the present invention include all evaporite minerals. Preferred evaporite minerals include trona, nahcolite, halite, potash, borax, mirabiulite, sylvite, carnallite, kalinite, soda nitire, nitire, langbeinite, polyhalite, schoenite, thenardite, gaylussite, pirssonite, Wegscheiderite, and other evaporites in the halite, carbonate, nitrate, iodate, borate, sulfate, and phosphate classes. Non-evaporite soluble minerals are also susceptible to solution mining using methods of the present invention. Such non-evaporite soluble minerals may be included in permeable formations such as sandstones. Such non-evaporite soluble minerals include uranophane, uraninite, chalcopyrite, chalcocite, galena, cuprite, and zincite. A preferred soluble mineral is trona.

Appropriate evaporite mineral formations for the solution mining methods of the present invention include classifications such as massive, bedded, or matrix. A massive ore example is salt in huge pure domes. A bedded ore example is trona beds sandwiched by oil shale. A matrix ore example is nodular and crystalline nahcolite contained in a nearly impervious oil shale formation. All may be solution mined using the present invention.

Drilling according to methods of the present invention includes the use of all types of drills known in the art, including down-hole turbine motor drilling units. Preferably, use of the drill is combined with use of an attached Measurement While Drilling (MWD) tool that uses mechanical and electronic techniques to allow drilling in a controlled directional manner. Another function of the MWD is to provide nearly real-time geophysical data to the driller on the surface who is steering the drilling assembly. The combination of tools used to drill and direct the drilling is commonly called the drilling assembly.

The first step of the method is drilling at least one access well accessing a soluble mineral formation. An access well includes a borehole that is drilled from the ground surface into a soluble evaporite or non-evaporite mineral ore body. Generally, an access well is not intended for solution mining in and of itself. Rather, an access well is generally used as a conduit for which fluid is conducted into and out from the lateral boreholes or the cavities that result from solution mining these lateral boreholes. The access well will typically be cased and cemented substantially from surface to the soluble evaporite or non-evaporite mineral formation that is the mining interval to prevent contact of mining solutions with natural rock and aquifers outside the area of the formation intended for mining. Generally, the access well primary casing is installed, cemented, and bonded to the wall of the borehole preferably from the end of the casing and up to the surface. The term casing refers to a pipe that is installed in the access well. A casing shoe is attached to the lower extremity of the casing to assist running the casing into the hole and cementing to create a casing to rock seal.

The at least one access well may be a single access well or two or more access wells. There is no upper limit on the number of access wells; instead, one skilled in the art can develop mining plans and configurations appropriate to the site and resource being mined in accordance with the methods of the present invention and determine the proper number of access wells accordingly.

The method further includes drilling at least two lateral boreholes, wherein the lateral boreholes communicate with each other and wherein at least one of the lateral boreholes is connected to at least one access well. Although the modifier 'lateral' is used to describe this type of borehole, it is to be understood that the term lateral generally indicates a borehole that is not an access well, and does not necessarily indicate the directional axis of the borehole's run. Lateral boreholes may extend in any direction relative to the access well, including substantially parallel to or continuing out from the access well. A lateral borehole typically has at least a portion of the borehole that is mineable or leachable, e.g., where the natural rock or mineral formation surrounding the borehole is exposed, and wherein a solution mining fluid can contact the natural rock or mineral formation. Lateral boreholes may have a number of configurations along their length, including a number of different types of curvatures. Typically, a lateral borehole will extend through an evaporite mineral or permeable ore mineral formation. A typical lateral borehole will extend from where the drill branched out from another borehole (lateral or access) until either the end of the drilling or until another branching occurs. A lateral borehole may also refer to a non-cased and non-cemented borehole that has a direct (i.e., non-branching) connection to an access well. Lateral boreholes are often referred to more simply as laterals.

Any number of lateral boreholes may be drilled in accordance with a mining plan developed in accordance with the methods of the present invention. There may be at least three lateral boreholes, at least four lateral boreholes, at least five lateral boreholes, or at least six lateral boreholes or more. Underground configurations of the present invention typically have a high ratio of lateral boreholes to access wells. For example, there may be a ratio of lateral boreholes to access wells of equal to or greater than about 1:1 (i.e., number of lateral boreholes:number of access wells); greater than or equal to about 2:1; greater than or equal to about 3:1; greater than or equal to about 4:1; or more.

The lateral boreholes are drilled such that they are in communication with each other. Communication refers to an open connection between boreholes such that, for example, a solution mining fluid can flow from one borehole into another. At least one of the at least two lateral boreholes is connected to (i.e., is in borehole communication with) at least one access well. Accordingly, each lateral borehole is connected to another borehole in at least two separate points. A lateral borehole may connect to an access well and another lateral borehole, or it may connect at two points or more to at least one other borehole or to more than one borehole. The lateral boreholes are connected to one another, or interconnected, at one single, multiply connected point.

To drill boreholes in accordance with the present invention, oil/gas/water drilling tools, techniques and services may be used. These types of tools may require adaptation as the evaporite ores can be incompatible with some of the more common drilling fluids and soft evaporite ores can create steering problems.

Directional drilling may be accomplished by the application of pressure against the side of the borehole to direct the bit in the opposite direction. The steering pressure point or points can be 40' behind bit, allowing drilling fluid the time to leach, weaken, or erode the wellbore. If the hole is washed out (mechanical erosion) or dissolved at the point of required contact or weakened sufficiently that it cannot support the required pressure, then directional drilling may be impractical. Successful directional drilling requires protecting the borehole from leaching, weakening and erosion. In the case of water-soluble ores, oil based drilling mud work can be used to protect the borehole. A less messy and lower cost alternative that is often found to provide sufficient wellbore protection is altering the chemistry of the water based drilling mud system. As an example, salt saturated drilling mud has been found useful in directionally drilling nahcolite, as nahcolite is nearly insoluble in salt saturated solutions. Alternatively, as nahcolite is naturally occurring baking soda, pre-saturating the direction drilling mud with baking soda has been found to protect the wellbore.

Borehole protection is also needed to prevent keyholing, a drilling term for a smaller diameter drill pipe slot cut into the inside of a curve. A keyhole can trap the drilling assembly when drilling out of the hole if a larger diameter drilling assembly is pulled into the smaller diameter keyhole slot. To avoid becoming stuck in the hole, drill bit cuttings must be cleared from the borehole quickly and efficiently. Horizontal boreholes are hard to clean, as the cuttings tend to lie down and allow the mud to slip past. The assistance provided by rotating the drill pipe and the drilling assembly is not always available when steering many types of directional drilling tools. Drilling in such conditions requires good mud and careful drilling. Careful drilling allows the operator to feel the increasing drag as cuttings build up in time to react using special measures to clean the hole before getting stuck. Techniques to clean the hole include such techniques as sliding the drill assembly in and out of the hole until the drag of the cuttings is cleared. If this occurs too often, improved mud chemistry, viscosity, and velocity may be required. The ability to increase mud velocity, when directionally drilling, may be limited, as doing so can disrupt the bit rotational speed and performance. Failures of mud chemistry and viscosity have been linked to adverse reactions with the solution mining ores. Mud experts are preferably contacted before drilling to properly design the mud system to clear the cuttings and protect the borehole's ability to support the directional drilling pad pressure. During actual drilling, the same expert should preferably provide continuous mud monitoring, evaluation and instructions to the driller.

In drilling evaporite mineral beds, once the drilling system is tuned in the field to protect the wellbore and provide the push needed to steer the drilling assembly, drilling is typically fast and easy compared to oil/gas/water drilling. Accordingly, extensive lateral borehole systems involving long lateral and numerous branching can be achieved at reasonable cost. Boreholes of about a mile in length may be achieved. Drilling lateral boreholes off of another borehole or directly from an access borehole is a procedure established in the oil/gas drilling industry. However, the ease of drilling in evaporite minerals makes the creation of lateral boreholes in such formations economically feasible, especially considering the advantages in increased solution mining efficiency.

Drilling of lateral boreholes in hard rock is often accomplished using a wedge set in the first borehole to deflect the drilling assembly into fresh rock. In most evaporite solution mining applications, the following more efficient method may be used instead. The method first includes drilling a first lateral borehole in a first direction having a forward end on a first plane. More specifically, after a first curve is drilled, the tool is returned to the beginning of the first curve and pointed to drill a curve in the opposite direction. The method can also include the step of reciprocating the drill from the forward end of the first lateral borehole to expand the first lateral borehole to include a second plane. More specifically, the bit is positioned so that it is cutting the backside of the initial curve, and the drill is reciprocated until a ledge is built on the backside of the initial curve, creating the second plane. When the bit can stand on the ledge and take weight, directional drilling of the second lateral borehole in the second plane can proceed as planned. While it is often impractical to reenter the first curve and lateral borehole once the second lateral borehole has been drilled off the backside, it is possible to drill off the backside of the second lateral borehole curve. Therefore, a third curve and lateral borehole can be extended off the second curve and lateral borehole, and the fourth curve and lateral borehole can be extended off the third, and so on. Creation of additional lateral boreholes may continue as long as keyholing and friction are under control. Connection of all of the lateral boreholes at or close to their furthest ends may be done by drilling yet another lateral borehole which intersects these ends. Drilling assembly and tubing reentry to the first drilled curve and lateral is possible using the emerging oil drilling tools and techniques.

The accuracy and precision required to drill interconnected lateral borehole systems can be achieved by standard directional drilling assemblies when combined with knowledge and observation of the geology, lithology, cuttings, drilling rate, geophysical logging and other geologic and drilling indicators. For example, in stratified formations a pair of boreholes could be intersected with confidence by drilling each along a geologic contact at a sufficient intersecting angle.

Curvature of the lateral boreholes is determined by the angle build rate of the drilling assembly and completion requirements. The angle build rate is commonly expressed in degrees of angle gained per 100 feet of drilling. Currently, the allowable bending limitation of the larger diameter casing and tubing often used in solution mining applications is such that the preferred angle build rate is about 8 to 12 degrees per 100 feet. An 8-degree build rate is about a 700-foot radius curve and a 12-degree build rate about a 500-foot radius curve. Angle build rates of about 12 degrees to about 20 degrees may also be used with special application casing or smaller diameter casing. It is important to fully examine the tightest portion of the curve and the limitations of the tubing joints that are bent and then operated in corrosive conditions, and subject to heating/cooling induced stress cycling.

Preferably, the boreholes are positioned such that at least a portion of the lateral boreholes are between about 25 feet and about 750 feet in distance from each other. Also preferred are distances of between about 50 feet and about 500 feet from each other; distances between about 100 feet and about 400 feet from each other, and distances from about 200 feet to about 300 feet in distance from each other. A more preferred distance from each other is between about 250 feet and about 275 feet in distance from each other.

The lateral boreholes may be disposed in any position relative to each other. In a preferred embodiment, at least a portion of the lateral boreholes is disposed substantially vertically with respect to each other. In another preferred embodiment, at least a portion of the lateral boreholes is disposed substantially horizontally with respect to each other. One of skill in the art with the knowledge of the present invention will be able to determine how to position the lateral boreholes with respect to each other for efficient mining of the resource. As an example, multiple horizontal evaporite beds can be simultaneously solution mined using a vertically stacked set of horizontal laterals where a lateral is placed in several of the horizontal beds and joined and mined with circulation in series.

Cavities developed by solution mining can quickly become so large that the injection and recovery flows cannot directly influence the flow in a cavity in a significant way. However, strong flow and mixing within a cavity is generally desirable to accomplish improved mining efficiency and resource recovery. Specific gravity gradients can be utilized to drive high flow rates and mixing within a cavity. The specific gravity gradients are created as the solvent absorbs the dissolved minerals and, in some cases, by solution temperature changes. Temperature changes can occur as heat is transferred to or from the earth and by endothermic and exothermic dissolution and precipitation chemistry. Large mass flow and mixing occurs when lighter specific gravity solvent enters the cavity at the bottom and rises to the top, drawing and mixing large volumes of solvent in the cavity. Factors that can be used by one expert in the field to utilize this cavity flow and mixing concept include chemistry, specific gravity gradient, viscosity, bed thickness, cavity size, cavity shape, and the amount and nature of the insoluble matter. As example, very high temperature can excessively break down the insoluble debris resulting from the dissolution process filling the cavity with a mush that chokes the desired flow and mixing within the cavity.

In order to more efficiently mine the bedded resource, the methods of the present invention may further comprise placing an artificial leach barrier within at least one lateral borehole to control the leach rate and direction of leaching of the minerals within the cavity or porous formation. Preferably, the artificial leach barrier is a gas and/or petroleum fluid and the cavity must be able to contain such liquid. Such artificial leach barriers are commonly used to improve the performance of vertical well solution mining methods. They work by controlling the relative vertical and horizontal leach rates to gain a preferred cavity shape. One skilled in the art can readily apply and benefit by the use of artificial leach barriers with the present invention.

In another embodiment of the present invention, methods of the present invention may further comprise drilling at least one of the lateral boreholes such that a natural barrier controls the relative vertical and horizontal leach rates to gain a preferred cavity shape. A horizontal natural barrier may preferably lie between the two lateral boreholes. The natural barrier may be either an intrabed natural barrier or an interbed natural barrier. Natural leach barriers are particularly useful for horizontal beds where applying an artificial leach barrier may be more difficult. An example of a natural intrabed barrier is a thin insoluble stringers lying within a bed. An example of a natural interbed barrier is an intervening layer of non-evaporite minerals between beds, such as a shale interval. One skilled in the art can identify and use of natural leaching barriers to improve the performance of the present invention. Natural leach barriers may be identified by study of geologic records such as exploration cores and well logs. Barriers may also be discovered during pilot or commercial mining operations by careful monitoring and observation.

As example, intrabed natural barriers can be used to favorably influence solution mining performance. Even in rich evaporite mineral beds, generally there is a significant insoluble content and the geologic deposition often may have consolidated the insoluble material into numerous stringers interspersed in the bed. A single insoluble stringer or, preferably, a series of insoluble stringers act as leach barriers and can be used to improve the solution mining performance in a manner similar to use of the massive natural barriers described above.

To mine matrix ore bodies, for example a nodular and crystalline nahcolite contained in a nearly impervious oil shale formation, the solvent and mining plan will preferably cause the failure of the nearly impermeable matrix containing the desired mineral. The failure can be induced chemically and/or mechanically. Previous patents teach how the oil shell matrix containing nahcolite may be heated to sufficiently to 'retort' the organic content of oil shale producing a crude oil-like substance. In a preferred embodiment, a lower temperature increase can avoid producing a crude oil but cause the oil shale to mechanically fail and expose the nahcolite to the solvent. A preferred lower solution mining temperature is about 100° F. above in situ temperature. Accordingly, a fluid may be injected into the lateral boreholes at an elevated temperature sufficient to attain a cavity that is about 100° F. above the in-situ rock temperature.

To mine a massive resource, traditional vertical independent wells mine cylinder shaped cavities hundreds of feet in diameter and height. Often, a long period of unproductive undercut mining is required to accomplish the preferred cavity size and shape. Methods of the present invention may be used to mine massive resources to reduce this unproductive period.

Once mine boreholes are drilled, methods of the present invention further include injecting a fluid into at least one access well. In one embodiment, the fluid may be injected from the shoe of the access well via injection into a lateral borehole. In various embodiments, the step of injecting a solvent into the at least one access well comprises injecting solvent through at least one tubing inserted into the access well or alternatively through an annulus defined by tubing in an access well. The fluid may exit the access well at the shoe of the access well. Alternatively, the tubing may be used to inject fluid into the lateral boreholes at locations other than the shoe of the access well, for example by insertion of the tubing some distance into the lateral borehole and directly injecting at the end of the tubing that is at some distance from the shoe of the access well. Placement of the injection tubing and injection point(s) preferably stimulates convective flow within the lateral boreholes. Tubing may be moved within the boreholes to change the actual fluid injection point. Additionally, tubing may be plugged to close off an injection point and perforated or parted to create a new injection point.

If multiple injection points are desired, injection can be made through an access well, from more than one access well, or through multiple telescoping tubings. In a preferred embodiment, the step of injecting a fluid comprises injecting fluid from more than one tubing inserted into the access well. For example, an access well connected to a lateral borehole can have a first tubing running from the surface through the access well and into the lateral borehole a first distance. This assembly can include a second tubing, smaller in diameter than the first, running through the first tubing and extending out the end of the first tubing into the lateral borehole a second distance. This assembly allows for injection of fluid at three points. The first injection point is at the connection of the access well and the lateral borehole through the annulus defined by the access well and the first tubing. The second injection point is at the point where the second tubing exits the first tubing through the annulus defined by the first and second tubings. The third injection point is at the end of the second tubing. Open-hole plugs may be used to seal off the borehole to direct the flow path of fluids in the mine or well.

Enhanced mining efficiency can often be gained by periodic flow reversal of the injection points and the collection points (as described below) and changing the injection and recovery point locations in the borehole and cavity system. Flow reversal is accomplished by changing the piping arrangement on the surface. Relocation of the injection and recovery points is accomplished underground. In some cases, the tubing extended into the lateral can be slid in or out to adjust the injection and recovery points. Injection and recovery points can be adjusted without moving the tubing by plugging and perforating or parting using known techniques. Lateral holes can be extended or new lateral holes from the access well or from previously drilling lateral borehole can be drilled. Solution mining systems and mine plans include the use of boreholes, casings, cement, tubing, tubing packers, plugs, packers and perforations, and, subsequent expansion and modification of the these is accomplished by adapting tools, techniques and services developed in the oil and gas drilling and production industry.

A solution mining fluid is any type of fluid that has the capacity to dissolve an evaporite or non-evaporite mineral. Preferably, the fluid is a solvent. An appropriate solvent can be determined by those of skill in the art depending on what mineral is being mined. The solvent is at a temperature suitable for dissolution of the evaporite mineral. In some embodiments, the solvent is heated and it can be heated to a temperature greater than about 10° C. or about 50° C. and can be heated up to about 95° C. or about 110° C. In a particularly preferred embodiment, the solvent is at significantly higher temperatures, as described below.

In one embodiment, the solvent avoids problems associated with what has been incorrectly identified as incongruent leaching of minerals. For trona solution mining, the basic solubility knowledge required to design a trona solution mine and produce trona and/or related compounds is largely available in Garrett, *Natural Soda Ash*. [Van Nostrand Reinhold] See also Example 1. The phase diagram describing the solubility and solid phases of the $Na_2CO_3$—$NaHCO_3$—$H_2O$ system is well known in the art. Those skilled in the art will recognize that if trona leaching is initiated with pure water as the solvent, the ions associated with sodium bicarbonate become saturated, before those associated with sodium carbonate, and may precipitate in the cavity. This can be avoided, if desired, by injecting the barren solvent resulting from cooling or cooling and evaporative crystallization of sodium sesquicarbonate or sodium bicarbonate. In either case, the trona depleted solvent can be heated and used as the injection solvent to dissolve trona without the so called incongruent leaching problems. Preferably, the solvent is heated and injected at about 130° C. and recovered at about 120° C. and cooled to about 30° C. producing sodium sesquicarbonate. In this case, a so called congruent leaching solvent results from heating the 30° C. solvent to the 130° C. injection temperature. Another example without limitation is when the solvent is heated to about 105° C., recovered at about 95° C., carbonated and cooled to about 30° C. to produce sodium bicarbonate. It is well known that a so called congruent leaching solvent can also be prepared by adding sufficient soda ash and/or caustic soda and/or lime to water. To those skilled in the art, it is apparent that direct crystallization of a range of trona related compounds such as sodium bicarbonate, monohydrate soda ash, decahydrate soda ash and anhydrous soda ash is possible at various temperatures after adjusting the carbonate and bicarbonate ion balance using known processes. Congruent solvents for solution mining can also include carbonic acid, sodium hydroxide and/or calcium hydroxide, in addition to sodium carbonate.

To avoid leaching salt that can naturally accompany trona in the ground, the trona can be solution mined with aqueous solutions presaturated with salt. As an example, sufficient hydroxide is added to the injected solvent to chemically convert the bicarbonate ions to carbonate ions at the point of dissolution resulting in salt brine rich in soda ash related ions that yields soda ash on cooling and/or evaporative concentration. Alternatively, several known processes can be used to simultaneously produce marketable trona, other trona related products and rock salt. The use of lime and hydroxide to improve salty trona solution mining is an example without limitation of the use of lime and hydroxide in the solution mining of trona and processing sodium compounds.

The widely used (low cost) source of hydroxide in the trona mining and sodium processing industry is lime ($Ca(OH)_2$). It is widely used to convert bicarbonate ions to carbonate ions as part of various well known processes. A well-known problem with use of lime in surface processes is the resultant limestone ($CaCO_3$) precipitation. Removal and disposal of the precipitated limestone is costly. The limestone removal and disposal need not be a problem for solution mining as the precipitated limestone can remain in the cavity as precipitated or be slurried into the cavity for disposal if precipitated in a surface process.

Figure 14:
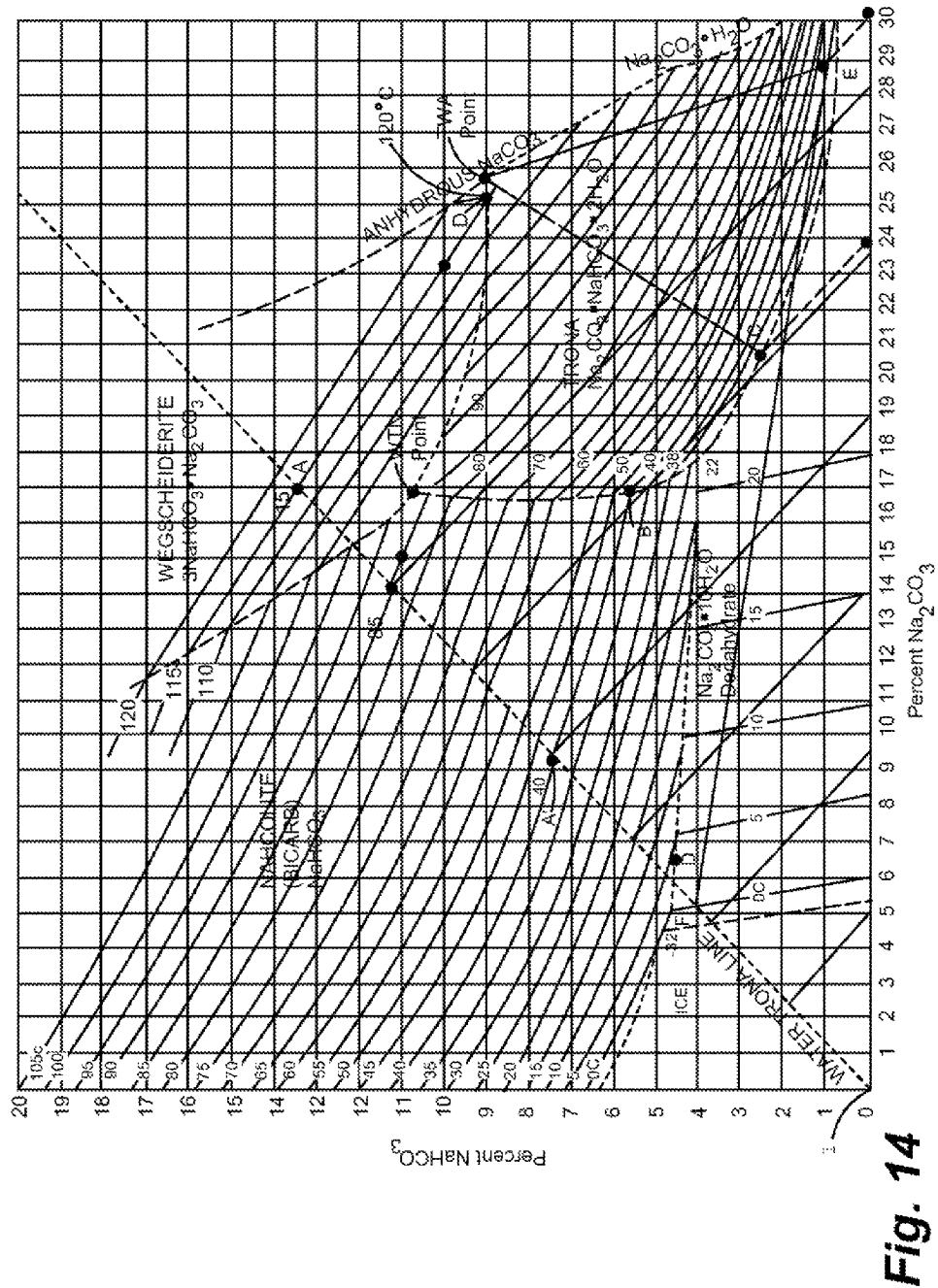
FIG. 14 is the solubility diagram for the $Na_2CO_3$—$NaHCO_3$ system.

One embodiment of the present invention includes injection of an aqueous solution, such as, substantially pure water, including, for example, very pure condensed steam or sodium decahydrate depleted solutions containing up to 6% $Na_2CO_3$ and 5% $NaHCO_3$, at a temperature sufficient to maintain the borehole and cavity dissolution system in the Wegscheiderite solid phase region shown on the phase diagram FIG. 14. For example, the temperature of the injected solution and/or the recovered (or removed) solution can be at least about 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., 200° C., 205° C., 210° C., 215° C., 220° C., 225° C., 230° C., 235° C., or 240° C. Such a cavity at rest becomes double saturated at temperatures and concentrations shown at the contact line of trona and Wegscheiderite solid phase regions. At 90° C., this is 18.2% $Na_2CO_3$ and 10.1% $NaHCO_3$. At 100° C., this is 21.5% $Na_2CO_3$ and 9.3% $NaHCO_3$. At 110° C., this is 24.1% $Na_2CO_3$ and 9% $NaHCO_3$. Preferably the cavity is operated such that the recovery temperature and concentrations approach the TWA triple point where the maximum concentration of 25.8% $Na_2CO_3$ and 9% $NaHCO_3$ is achieved at 117° C. Temperatures above the TWA point reduce the concentration of the saturated solutions. At 120° C., the concentration reduces to 25.6% $Na_2CO_3$ and 9% $NaHCO_3$. At 130° C., the concentration reduces to 24.8% $Na_2CO_3$ and 9% $NaHCO_3$. At 140° C., this is 24.3% $Na_2CO_3$ and 9% $NaHCO_3$. Temperatures below the TWA point also reduce the concentration of the saturation solutions. At 115° C., the concentration reduces to 25.1% $Na2CO3$ and 9% $NaHCO3$. At 110° C., the concentration is reduced to 24% $NaCO3$ and 9% $NaHCO3$. Consequently, in further preferred embodiments, the temperature of the injected solution and/or the recovered (or removed) solution can be in the range of between about 90° C. and about 240° C., between about 100° C. and about 190° C., between about 105° C. and about 170° C., between about 110° C. and about 145° C., between about 115° C. and about 120° C.

Another aspect of the invention is that by solution mining in accordance with the teachings herein, solution mining of trona deposits can be conducted at about the TWA point for a given deposit such that the mining solution as it is removed is at about the TWA point temperature. At precisely the TWA point temperature, the mining solution would be at maximum solubility of sodium bicarbonate and sodium carbonate achievable in the Wegscheiderite solid phase region. However, it should be recognized that control of temperatures and concentrations in mining solutions is not absolutely precise. Thus, in other embodiments, the solution mining of trona deposits is conducted to produce a mining solution in which both sodium bicarbonate and sodium carbonate are at greater than about 75% of maximum solubility, greater than about 80% of maximum solubility, greater than about 85% of maximum solubility, greater than about 90% of maximum solubility, greater than about 95% of maximum solubility, or greater than about 99% of maximum solubility. Further embodiments of the invention include mining solutions per se having sodium bicarbonate and sodium carbonate concentrations in these ranges as well.

In one embodiment of the process, the aqueous injection solution comprises condensed steam produced by evaporation of water from a solution to produce sodium carbonate products, such as sodium carbonate monohydrate, for example, from operation of the monohydrate process. As used herein, reference to the "monohydrate process" refers to a process in which a sodium carbonate solution is treated to produce soda ash by evaporating water from the sodium carbonate rich solution in an evaporator circuit, crystallizing sodium carbonate monohydrate from the pregnant mother liquor. In various embodiments, the condensed steam produced by evaporation of water from a solution to produce sodium carbonate products constitutes at least about 25 wt. %, at least about 50 wt. %, at least about 75 wt. %, at least about 90 wt. %, at least about 95 wt. %, or at least about 99 wt. % of the aqueous injection solution. In various other embodiments, the aqueous injection solution does not include any recycled or recirculated mining solution taken from the mining cavity.

This process further includes removing aqueous solution from the cavity, wherein trona from the cavity is dissolved into the solution before it is removed. Alkaline values are then recovered from the removed aqueous solution by a variety of processes.

During highly saturated operating periods (for example, at low mining rates or when restarting a hot cavity), solution mining with recovery at the TWA maximum concentration can include dilution of the mining solution to prevent precipitation blockage of the casing and pipeline system because either heating or cooling causes supersaturation. An alternative to dilution is operation where the recovery solution temperature is a little below the TWA point so that solution can be heated to a little above the TWA temperature and allowed to cool somewhat during pipeline transport. A preferred alternative is operation at a temperature a little above the TWA temperature such that the cooling experienced during the pipeline transportation from the cavity to surface and to the processing plant does not supersaturate or cause precipitation that could obstruct the flow.

The high concentration of the solutions at the TWA point and the reverse solubility at temperatures above the TWA that can be used to avoid pipeline plugging combine to provide a highly productive and easy to operate trona solution mining opportunity that is easily utilized by those skilled in the art. Existing facilities can be retrofitted or new facilities constructed to gain the advantages of this opportunity. This process is a low cost production opportunity for numerous sodium products such as sodium sesquicarbonate, sodium bicarbonate, sodium carbonate monohydrate and anhydrous sodium carbonate using existing processes such as fortification, steam stripping, carbonation and numerous other well-known sesquicarbonate, bicarbonate and soda ash processes.

In a further embodiment of the present process, the mining process is conducted until the trona deposits are effectively depleted, as described above. In accordance with the present invention, during the trona mining, Wegscheiderite and/or nahcolite is precipitated from the mining solution. This embodiment of the invention includes further injecting an aqueous solution in a cavity that is effectively depleted of trona and that includes precipitated Wegscheiderite and/or nahcolite to dissolve the Wegscheiderite and/or nahcolite. The resulting solution will eventually become saturated in both sodium bicarbonate and sodium carbonate. As the solution is removed from the mine, alkaline values are recovered from the aqueous solution by conventional processes. In this embodiment, the temperature of the solution for dissolving Wegscheiderite and/or nahcolite is high enough so that, in preferred embodiments, the removed mining solution is greater than about 30° C., between about 30° C. and about 240° C., between about 65° C. and about 180° C., and between about 100° C. and about 120° C.

A further embodiment of this process includes introduction of lime ($Ca(OH)_2$) into the underground cavity. In this embodiment, the lime can be introduced into the cavity at the point at which the mining solution is being injected. Alternatively, lime can be introduced into the cavity at a point removed from the point at which the mining solution is being injected. In either embodiment, the introduction of lime into the solution having sodium bicarbonate ions will cause the formation of calcium carbonate ($CaCO_3$). Calcium carbonate that is formed will settle from the solution and largely be removed from the mining solution prior to removal of the solution from the cavity. In an alternative embodiment, the process includes removing aqueous solution from the cavity and subsequently introducing lime to the removed solution on the surface. the introduction of lime into the solution will cause the formation of calcium carbonate ($CaCO_3$). Calcium carbonate that is formed will settle from the solution and can be disposed of by introduction into a mining cavity in a slurry. The mining cavity can be one that is being actively mined because the slurried calcium carbonate will settle out of the mining solution and remain in the cavity. Alternatively, the slurried calcium carbonate can be introduced to a mine cavity that is no longer be actively mined.

Figure 15:
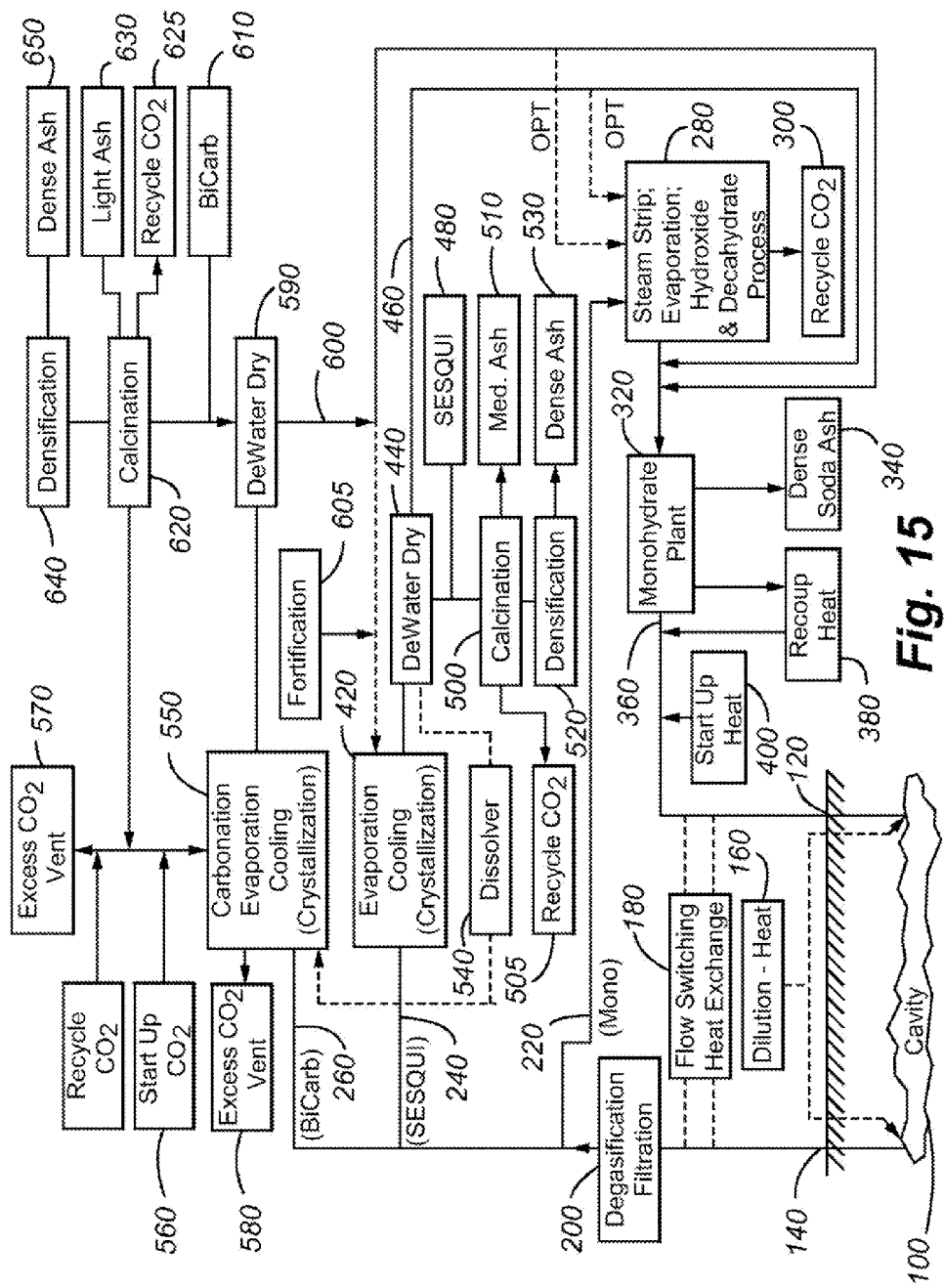
FIG. 15 illustrates various configurations for processing mining solution from the present invention.

With reference to FIG. 15, various preferred embodiments of the present invention are illustrated. An aqueous mining solution is introduced to an underground cavity 100 at 120. The underground cavity 100 is a trona deposit cavity and the mining solution is at a temperature sufficient to maintain at least a portion of the mining solution in the cavity 100 in the Wegscheiderite solid phase region and preferably such that the recovery solution is at about the TWA point temperature. As trona in the cavity 100 is dissolved, sodium, carbonate and bicarbonate ions go into solution in the aqueous mining solution. Mining solution resulting from the trona dissolution process is removed from the cavity at 140. The underground mining operation can include dilution of the mining solution and/or addition of heat to the mining solution by introduction of additional fluid from a source 160 to the underground cavity 100. This step of dissolution can be used to prevent precipitation blockage of the casing and pipeline system that may occur due to supersaturation.

An alternate means of preventing precipitation blockage of the pipeline is bring the mining solution removed from point 140 into thermal communication with hotter mining injection solution prior to entry to the cavity at point 120 in a heat exchanger 180. Flow switching, alternating the wells used for injection and recovery, causes the injection solution to dissolve the precipitation blockage from the well previously in service recovering the solutions. The mining solution withdrawn from the cavity of point 140 can be further treated by a degasification and/or filtration process 200. The resulting mining solution can then be treated by the monohydrate process 220, the sesquicarbonate process 240, or by carbonation to form bicarbonate 260.

Prior to being treated in the monohydrate process 220, the mining solution can be pretreated by using a number of known processes, including fortification, steam stripping, evaporation, the hydroxide process, or the sodium carbonate decahydrate process 280. Carbon dioxide produced by any of these processes can be recycled 300 for carbonation in the bicarbonate process 260.

After any pre-treatment steps, the mining solution is introduced to conventional monohydrate processing 320. The primary product from the monohydrate process is dense soda ash 340. Water that is driven off from the solution as part of crystallization in the monohydrate process can be condensed, for example, by mechanical vapor recompression. The temperature of such a condensate is typically about 125° C. Waste heat from the monohydrate process 380 can be introduced to further heat the condensate. Alternatively, or in addition, start-up or trim heat 400 can be introduced to the condensate to heat the condensate prior to introduction into the underground cavity 100.

Prior to treatment by the monohydrate process, the mining solution exiting the degasification/filtration unit 200 can be treated by the sesquicarbonate process 240. This process involves crystallization of sesquicarbonate crystals in the solution by cooling and/or evaporation 420. The crystals can be dewatered and dried 440 with the liquid 460 from the dewatering step being introduced to the monohydrate plant 320. Prior to introduction of the liquid 460 from the dewatering step 440 into the monohydrate plant 320, the liquid 460 can be optionally treated by one of fortification, steam stripping, evaporation, the hydroxide process, or the sodium carbonate decahydrate process 280.

The sesquicarbonate crystals 480 that are dewatered and dried are a commercial product or they can be subjected to calcination 500 to form a medium ash product 510 or the medium ash product 510 can be subjected to densification 520 to form a dense ash 530. Alternatively, the wet cake from the dewatering step 440 can be introduced to a dissolver 540 with the resulting solution being introduced to the crystallization step of the bicarbonate process 260.

In a further embodiment of the process, the mining solution, prior to being subjected to the monohydrate process 220 can be processed by carbonation of the solution to form bicarbonate 260. Solution exiting the degasification/filtration operation 200 can be carbonated and then subjected to crystallization of sodium bicarbonate by evaporation and/or cooling 550. Carbon dioxide for the step of carbonation can be introduced from the recycle stream 300, the calcination steps 505, 625, or can be introduced as start-up carbon dioxide 560. Excess carbon dioxide in this process can be vented 570. In addition, excess $CO_2$ can be vented 580 from the carbonation and crystallization operation 550. Sodium bicarbonate crystals produced in the crystallization unit 550 can be dewatered and dried 590. The resulting liquid 600 can be treated in the same manner as the liquid 460 from the dewatering process 440. Namely, the liquid can be optionally treated 280 or introduced directly into the monohydrate plant 320. Liquid 600 can alternatively be fed to the process 420. In a further alternative embodiment, the liquid 600 can be fortified 605 with additional sodium carbonate values, such as from trona ore or off-spec sodium products. The crystals resulting from the crystallization process 550 can be used directly as a sodium bicarbonate product 610. Alternatively, the sodium bicarbonate can be calcined 620 to form light ash 630. The light ash can be further densified 640 to form dense ash 650.

Once fluid is injected in the boreholes, the method further includes circulating the fluid through at least one access well and at least two lateral boreholes wherein controlled fluid flow is maintained between at least two lateral boreholes. Circulation of fluid can be achieved in a number of ways. Circulation may be achieved by the inlet fluid pressure caused and maintained by injection of the fluid into the mine. Circulation may also be achieved by mine design and fluid injection points that utilize the presence of natural convective flow caused by differing densities of barren and pregnant solutions. Gas lift and electrical-mechanical pumps can also be used to circulate the mining fluids.

When more than one lateral borehole is being solution mined at the same time, substantially equal or controlled fluid flow is maintained between the lateral boreholes. Controlled flow, in the context of this invention, refers to fluid flows that are similar enough that one of the two or more lateral boreholes is not effectively blocked or plugged and/or that rates of mining and/or borehole enlargement are similar between at least two lateral boreholes. To determine whether a borehole is flowing, plugs may be inserted to test each individual lateral borehole for flow. Boreholes, particularly after a period of solution mining, may vary in size, causing the flow rate to differ between the boreholes. However, there should be measurable flow in each lateral borehole. Preferably, the values for the flow rates (e.g., in terms of volume per time) between at least two of the lateral boreholes are within about 50%, more preferably about 30% and more preferably about 15% of each other.

In one embodiment, the circulating step includes flowing the fluid through the at least two lateral boreholes in a parallel flow. A parallel flow indicates that all the lateral boreholes contain fluid traveling in the same direction through the boreholes. In this flow configuration, generally plugs are not placed within the lateral boreholes to influence flow direction. Another characteristic of parallel flow is that fluid in one lateral borehole will not thus circulate the full length of another lateral borehole, but rather, will typically connect with an access well or with an access well after traversing less than the full length of another borehole.

In another embodiment, the circulating step includes flowing the fluid through the at least two lateral boreholes in a serial flow configuration. Plugs, tubing packers, and tubing may all be used to forcefully circulate fluid in a serial flow through the lateral boreholes. Such a serial flow has the benefit of forcing solution mining of each borehole. If one borehole becomes restricted of stops flowing, the entire flow circuit is interrupted and the miner has early notice of the problem. In one embodiment, serial flow is achieved by the placement of at least one plug in the at least two boreholes which communicate with each other.

Methods of the present invention further include collecting a pregnant solution containing a dissolved evaporite mineral. Collection may be done in a similar manner and with similar equipment as described for injection. In one embodiment, the step of collecting the pregnant solution containing a dissolved evaporite mineral comprises collecting said pregnant solution at the shoe of the well at the access well. In another embodiment, the fluid is collected in the annulus of the access well. In another embodiment, the step of collecting a pregnant solution containing a dissolved evaporite mineral comprises collecting said pregnant solution with at least one tubing placed within an access well into at least one lateral borehole. Placement of the collection tubing and collection point(s) is preferably designed to take advantage of natural convective flow within the lateral boreholes. Tubing may be moved within the boreholes to change the actual fluid collection point after a period of collection at one point. Additionally, tubing may be plugged to close off an collection point and the tubing can be cut or perforated to establish another collection point.

A number of injection and collection plans are contemplated by the present invention. One preferred method for solution mining is implemented by injecting fluid in the at least one tubing or from multiple tubings or multiple injection points and extracting the saturated fluid through the annulus between the tubing and the access well cemented casing (i.e., the 'shoe' of the well.) Another preferred method for solution mining includes the step of injecting through the annulus and producing via the tubing or multiple tubings. In another embodiment, the at least one access well comprises a first and second access well, and the step of injecting a solvent comprises injecting the solvent through the annulus or through at least one tubing inserted into the first access well, and the step of collecting a pregnant solution comprises collecting the pregnant solution from the annulus or from at least one tubing inserted into the second access well.

In another embodiment of the present invention, there is provided a method for solution mining of an evaporite mineral that includes drilling at least one access well accessing an evaporite mineral formation and drilling at least two lateral boreholes. The at least two lateral boreholes communicate with each other and at least one of the lateral boreholes is connected to an access well. The method further includes injecting a fluid into the at least one access well, and circulating the fluid through the at least one access well and the at least two lateral boreholes in a serpentine flow pattern. The method further includes collecting a pregnant solution containing at least one dissolved evaporite mineral.

A serpentine flow refers to a serial flow pattern, e.g. a flow pattern that starts with the fluid being injected at one point or end, and flowing through all of the boreholes sequentially until the exit point. Plugs, tubing packers, and tubing may all be used to forcefully circulate fluid in a serpentine flow pattern through the lateral boreholes. Such a serpentine flow has the benefit of forcing solution mining of each borehole. In one embodiment, serpentine flow is achieved by the placement of at least one plug in the at least two boreholes which communicate with each other.

FIGS. 1 through 6 provide examples of a solution mining system prepared in accordance with the present invention. FIG. 1 shows a single access well system having two lateral boreholes for solution mining. Access well A1 (only its it lower extremity of the access well shows in this and other figures) is drilled and completed to access a mineral formation for solution mining. The view of the figure could be an overhead or side view relative to the ground surface depending on the resource to be mined and the mine plan. The access well is drilled to intercept the solution mining interval in a preferred manner, cased and cemented to bond the casing to the borehole. For one scenario the access well is conventionally drilled from surface vertically for some distance and then directionally drilled to become tangent with the floor of a nearly horizontal bedded evaporite bed. At this point, drilling is stopped, the drill string and drilling assembly (not shown) are pulled out, casing AA is run from surface to near the bottom of the access well borehole as shown and is cemented to bond the casing to the borehole wall preferably from the lower end of the casing to the ground surface. At this point, the access well is used to drill the lateral boreholes preferably using a smaller diameter directional drilling assembly so that it can pass inside the access well to drill the lateral boreholes. Lateral borehole A11, with connection to an access well, is drilled in an S configuration away from the extended centerline of access well A1 and then curved back to parallel that centerline for some distance to point AB. The directional drilling assembly is then returned to the beginning of the initial curve of lateral borehole A11 and a lateral borehole A12 is drilled to branch off the backside of that curve and extend substantially along the extended centerline of access well for some distance before being its drilling is steered to communicate with lateral borehole A11 at point AB. Accordingly, lateral borehole A11 has a first end in communication with access well A1 and a second end in communication with lateral borehole A12 at point AB, and lateral borehole A12 has a first and second end in communication with lateral borehole A11. Tubing AC, with packer, (packers are shown in this and other figures as an individual packer but it understood that one skilled in the art may use more than one packer and that a packer or packers can be used in combination with cement or other substance that assists borehole and cavity isolation in accordance with the mine plan) is installed from surface and set near the first end of lateral borehole A12 and tubing AD, without packer, is installed from surface to near the second end of lateral borehole A12. Mining would proceed with solvent injection from the ends of tubing AC and AD and recovery from the shoe of the access well A1. At intervals in the solution mining process the injection and recovery flows are reversed and tubing AD can be advanced or withdrawn or plugged and perforated to improved resource recovery by altering the injection/recovery locations. Should a mine plan require the tubing extended into both laterals A11 and A12, the drilling industry provides the means to do so. Tubing only in the last drilled lateral is preferred as it is easiest to accomplish and often provides sufficient flow distribution.

FIG. 2 provides another example of a solution mining system prepared in accordance with the present invention. FIG. 2 shows a single access well system having four lateral boreholes for solution mining a mineral resource. Access well B1 is drilled to access the mineral formation. The view of the figure could be an overhead or side view relative to the ground surface depending on the resource to be mined and the mine plan. The access well is drilled to access the resource in a preferred manner, cased and cemented to bond the casing to the wall of the access well borehole. For one scenario the access well is conventionally vertically drilled from surface for a distance and then directionally drilled to intercept the solution mining interval such that laterals extended from access well B1 can be tangent with and extend along the floor of a nearly horizontal bedded evaporite bed for a great distance. At this point, drilling is stopped, the drill string and drilling assembly (not shown) are pulled out, casing BA is run from surface to near the bottom of the access well borehole as shown and is cemented to bond the casing to the borehole wall preferably from the lower end of the casing to the ground surface. At this point, the lateral boreholes are drilled preferably using a smaller diameter directional drilling assembly so that it can pass inside the access well to drill the lateral boreholes. The first lateral borehole B11 is drilled in an S curve manner, previously described, to point BB. Lateral B12 is drilled second off the backside of the second lateral B11 curve in an S manner to extend for some distance substantially parallel with lateral B11 to point BC. Lateral B13 is drilled third off the backside of the second curve of lateral B12 in an S curve manner and extended substantially parallel to lateral B11 to point BD. Lateral B14 is drilled fourth off the backside of the initial curve in lateral B11 to extend for some distance substantially parallel the extended centerline of access well B1 for a distance where it is steered to communication with laterals B11, B12 and B13 at points BB, BC and BD respectively.

Accordingly, lateral borehole B14 has a first end in communication with lateral B11 and a second end at point BD having communication with the second ends of laterals B11, B12 and B13 noted as points BB, BC and BD. Tubing BE, with packer, is installed from surface and set in the first end of lateral B14. Tubing BF, without packer, is installed from surface to just short of point BB in lateral B14. Tubing BG, with packer, is installed from surface and set just short of point BC in lateral B14. Tubing BH, with packer, is installed from surface and set near end of lateral B14 just short of point BD. Mining can progress with solvent injection from tubing BE, BF, BG and BH, in which case, pregnant solution is collected at the shoe of access well B1. In this manner, measurable forced flow is achieved in all laterals and each lateral has a source of fresh injection fluid. At intervals in the solution mining program, the injection and recovery flows are reversed to improve mining performance. Except for laterals B11 and B14 (that are mined in series) the laterals can be mined simultaneously or individually. This provides the miner operating flexibility. In this example and the other examples, one skilled in the art will find use for more or less laterals, tubing, tubing packers.

FIG. 3 provides another example of a solution mining system prepared in accordance with the present invention using a parallel flow of fluid for solution mining. FIG. 3 shows a single access well system having five lateral boreholes for solution mining a mineral resource. Access well B1 is drilled to access the mineral formation to be solution mined. The view of the figure could be an overhead or side view relative to the ground surface depending on the resource to be mined and the mine plan. The access well is drilled, cased and cemented to bond the casing to the borehole of the access well. For one scenario the access well C1 is conventionally vertically drilled to the top of a solution mining interval. At this point, drilling is stopped, the drill string and drilling assembly (not shown) are pulled out, casing is run from surface to near the bottom of the access well borehole as shown and is cemented to bond the casing to the borehole wall preferably from the lower end of the casing to the ground surface. At this point, the lateral boreholes are drilled preferably using a smaller diameter directional drilling assembly so that it can pass inside the access well to drill the lateral boreholes. The first lateral borehole C11 is drilled in an S curve manner, extended substantially parallel to an extension of the access well centerline and then curved back to that centerline to intersect the centerline extension at point CA. Lateral C12 is drilled second off the backside of the second curve of lateral C11 in a S manner, extended substantially parallel a extension of the access well and then curved back to point CB to communicate with the third curve of lateral C11. Lateral C13 is drilled third off the backside of the first curve of lateral C11 in an S curve and extended substantially parallel to other laterals and then curved back to communicate with lateral C11 at point CA. Lateral C14 is drilled fourth off the backside of the second curve in lateral C13 in an S curve and extended substantially parallel to the other laterals and then curving back to communicate with lateral C13 at point CC. Lateral C15 is drilled fifth off the backside of either of the first curves of lateral C11 or C13 and extended to communicate with laterals C11 and C13 at point 33.

Accordingly, lateral C15 has a first end in communication with lateral C11 or C13 and a second end in communication with laterals C11 and C13 at the single, multiply connected point CA; lateral borehole C11 has a first end in communication access well C1, communication with the second end of lateral C12 at point CB and a second end in communication with laterals C15 and C14 at the single, multiply connected point CA; lateral borehole C12 has a first end in communication with the second curve of lateral C11 and a second end in communication with lateral C11 at point CB; lateral borehole C13 has a first end in communication with the first curve of lateral C11, communication with the second end of lateral C14 at point CC and a second end in communication with laterals C11 and C15 at point CA; and lateral C14 has a first end in communication with the second curve of lateral C13, and a second end in communication with the third curve of lateral borehole C13 at point CC. Tubing CD, with packer, is installed from surface and set near the first end of lateral C15 as shown. Tubing CE, without packer, is installed from surface to near the second end of lateral C15. Mining would progress with solvent injection from the shoe of access well C1 and tubing CD into all the lateral boreholes in a substantially parallel manner. The pregnant solution is collected with recovery tubing CE. At intervals in the solution mining process, the injection and recovery flows can be reversed and tubing CE can be advanced or retracted or plugged or perforated to move improved resource recovery. FIG. 3 is two dimension but one skilled in the art will, for some resources, find application where the preferred laterals arrangement is a three dimensional rosette. It is not necessary to provide drilled connection of the lateral second ends if the desired flow is passing a permeable formation between the laterals such as in solution mining sandstone related uranium ores.

Figure 4:
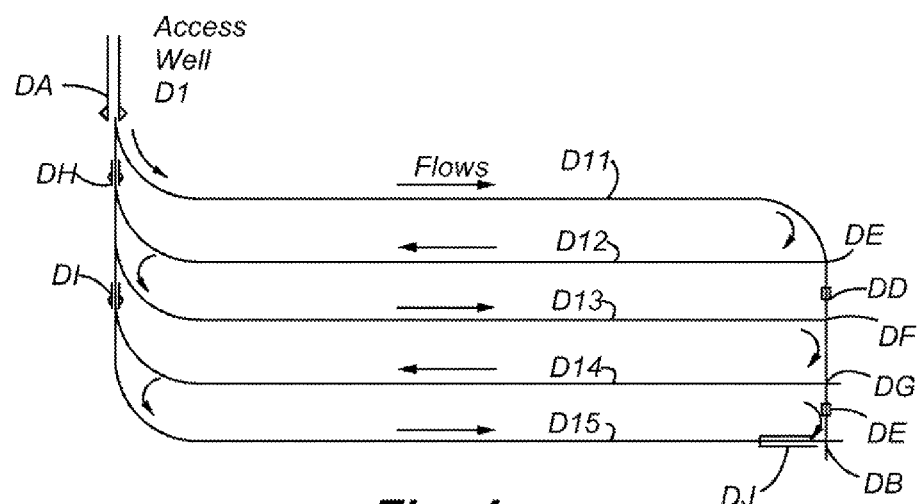
FIG. 4 illustrates an underground configuration of the present invention having one access well and five lateral boreholes designed for series or serpentine flow within the lateral boreholes.

FIG. 4 provides another example of a solution mining system prepared in accordance with the present invention using a series or serpentine flow of fluid for solution mining. FIG. 4 shows a single access well system having five lateral boreholes for solution mining a mineral resource. Access well D1 is drilled to access the mineral formation to be solution mined. The view of the figure could be an overhead or side view relative to the ground surface depending on the resource to be mined and the mine plan. The access well is drilled, cased and cemented to bond the casing to the access well borehole. For one scenario, the access well D1 is drilled vertically to the top of a multiple, nearly horizontal, bedded evaporite resource (bed 1 top-bed 5 bottom). At this point, drilling is stopped, the drill string and drilling assembly (not shown) are pulled out, casing DA is run from surface to near the bottom of the access well borehole as shown and is cemented to bond the casing to the borehole preferably from the lower end of the casing to the ground surface. At this point, the lateral boreholes are drilled preferably using a smaller diameter directional drilling assembly so that it can pass inside the access well to drill the lateral boreholes. The first lateral borehole D11 is drilled to curve about 90 degrees relative to access well D1 to become tangent with the floor of bed 1, drilled for a certain length along the floor of bed 1 and then is curved back so that it parallels an extended centerline of access well D1 to point DB. The drill is refracted and plugs DC and DD are set in lateral D11 to block subsequent communication of laterals D12 to D13 and D14 to D15 respectively. Plugs, in this and similar applications used as examples of this invention, may be a single or multiple mechanical plugs and/or cement or other plugging substances. The direction drilling assembly is then returned to the first end of lateral D11 and a second lateral D12 is drilled off the back side of the first curve of lateral D11 for some distance along the extended centerline of access well D1 and then turned about 90 degrees a manner similar to the first curve of lateral D11 to become tangent with the floor of bed 2 and extend along the floor of bed 2 to intersect and communicate with lateral D11 at point DE. The drill is then retracted to the first end of lateral D12 and lateral D13 drilled in a similar manner to lateral D12 to become tangent with the floor of bed 3 and extend along the floor of bed 3 to intersect and communicate with lateral D11 at point DF. The drill is then retracted to the first end of lateral borehole D13 and lateral D14 is drilled similar manner to lateral D13 along the floor of bed 4 to communicate with lateral D11 at point DG. The drill is then retracted to the first curve of lateral D14 and lateral D15 is drilled in a similar manner to D14 along the floor of bed 5 to communicate with lateral D11 at point DB.

Accordingly, lateral D11 has a first end in communication with access well D1 and a second end in communication with lateral D15 at point BB and is in communication with laterals D12, 13 and D14 at points DE, DF and DG respectively; lateral borehole D12 has a first end in communication with the first curve of lateral borehole D11 and a second end in communication with lateral D11 at point DE; lateral D13 has a first end in communication with the first curve of lateral 12 and a second end in communication with lateral D11 at point DF; lateral D14 has a first end in communication with the first curve of lateral D13 and a second end in communication with lateral D11 at point DG; and lateral D15 has a first end in communication with the curve of lateral D14 and a second end in communication with lateral D11 at point DB.

To establish serpentine flow, plugs DC and DD were placed in lateral D11 as previously described. Tubing DH, with packer, is installed from surface and set in laterals D12 before the lateral D12 and D13 branch. Tubing DI, with packer, is installed from surface and set in lateral 14 before the branch of lateral D14 and D15. Tubing D, without packer, is placed from surface to the near the end of lateral D15 at point DB as shown. Mining would progress with solvent injection from the shoe of access well D1 into lateral D11. Solvent is then conducted through all lateral boreholes in a serpentine or series manner with a flow direction as indicated in FIG. 4, culminating with collection from recovery tubing DJ. At intervals in the solution mining process the injection and recovery flows are reversed and plugs, tubing packers, and tubing DJ can be extended or extracted or plugged or perforated to improved resource recovery. The ability to independently mining of laterals D11 and D12, D13 and D14 or D15 and the potential to improve resource recovery by so doing is evident to one skilled in the art. Also evident is the use of a second lateral D13 curve to communicate the second ends of laterals D13 and D14, thus eliminating both plugs DC and DD and the extension of lateral D11 beyond point DE. In either case, all laterals are mined with forced flow and tubing DH and DI can also be used for injection or recovery.

Figure 5:
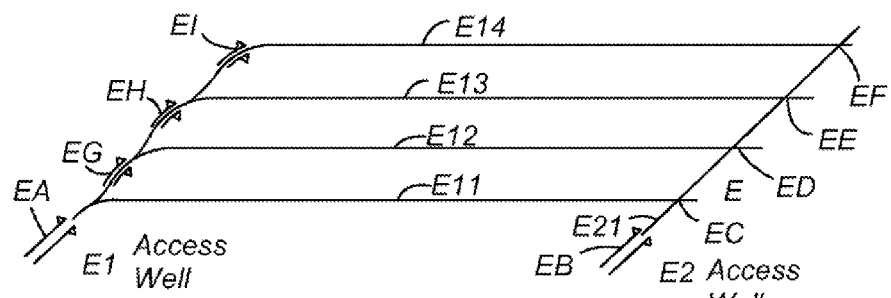
FIG. 5 illustrates an underground configuration of the present invention having two access wells and five lateral boreholes.

In FIG. 5, a dual access well system for solution mining a mineral resource is shown. FIG. 5 shows a dual access well system having four lateral boreholes for solution mining a mineral resource. Access wells E1 and E2 are drilled to access the mineral formation to be solution mined. The figure could be an overhead or side view relative to the ground surface depending on the resource to be mined and the mine plan. The access wells are drilled, cased and cemented to bond the casing to the wall of the access well borehole. For one scenario the access wells are initially drilled down vertically and then directional drilled to intercept the solution mining interval in a preferred manner such as tangent with the floor of a nearly horizontal bedded evaporite bed. At this point, drilling is stopped, the drill string and drilling assembly (not shown) are pulled out, casings EA and EB are run from surface to near the bottom of the access well boreholes as shown and are cemented to bond the casings to the borehole walls preferably from the lower end of the casing to the ground surface. At this point, the lateral boreholes are drilled preferably using a smaller diameter directional drilling assembly so that it can pass inside the access well to drill the lateral boreholes. The first lateral E11 is drilled from the access well E1 to an angle of 45 degrees and extended a substantial distance to point EC. The drill is then retracted to the first end of lateral E11 and lateral E12 is drilled off the backside of lateral E11, extended in an S curve to become offset and parallel to lateral E11 and extend to point ED. Similarly, lateral E13 is drilled off the backside of the lateral E12 curve to point EE and lateral E14 is drilled off the backside of the lateral E13 curve to point EF. Lateral E21 is drilled from access well E2 to communicate with the second ends of the laterals E11, E12, E13 and E14 at points EC, ED, EE and EF respectively.

Accordingly, a first end of lateral E11 communicates with access well E1 and a second end in communication with lateral E21 at point EC, the first end of lateral E12 communicates with the lateral E11 S curve and a second end in communication with lateral E21 at point ED, the first end of lateral E13 communicates with the lateral E12 S curve and a second end communication with lateral E21 at point EE, and the first end of lateral E14 communicates with the lateral E13 S curve and a second end in communication with lateral E21 at point EF. Tubing EG, with packer, is inserted from surface via access well E1 into lateral E12 and set before the E12 and E13 branch. Tubing EH, with packer, is inserted from surface via tubing EG into lateral E13 and set before the junction of lateral E13 and E14. Tubing EI, with packer, is inserted from surface via tubing EH and set in the S curve of lateral E14. Mining can be initiated by injection of solvent from access well E1, tubing EG, tubing EH and/or tubing EI. Examples of modifications that one skilled in the art may find attractive is using three packers on a single tubing to replace the telescoped tubing arrangement EG, EH and EI. Another such example is using similar tubing/packer arrangements in the lateral E21 instead of or to compliment those extending from access well E1. One skilled in the art can use such options in a manner to mine the laterals in series, parallel or individually. One skilled in the art can mine an individual lateral before drilling and mining the next lateral. The number of possible mining laterals is not limited to the four used in this example. Possible additional laterals include those that are drilled from windows cut in the cased and cemented access well E1 to connect to windows cut in the access well E2.

Figure 6:
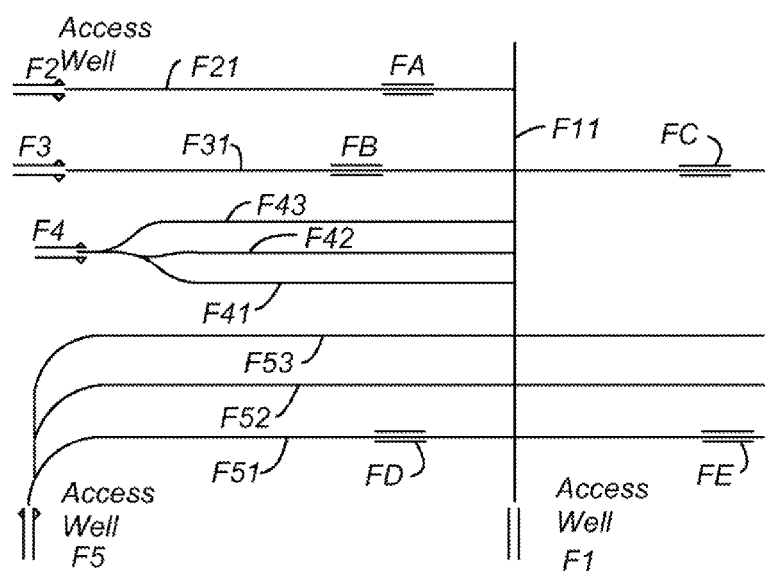
FIG. 6 illustrates an underground configuration of the present invention having six access wells and multiple lateral boreholes.

In FIG. 6, a multi-access well system for solution mining a mineral resource is shown. The FIG. 6 could be an overhead or side view relative to the ground surface depending on the resource to be mined and the mine plan. The figure demonstrates that one skilled in the art can use any number of access wells, lateral wells, tubing strings, packer and plugs in various manners and at various orientations to each other. For one scenario, the access well F1 and its lateral F11 are conventionally drilled vertically while access wells such as F2, F3, F4 and F5 are radially positioned (not evident in the two dimension figure) around the vertical access well F1 and directionally drilled to serve as conduits for laterals drilled along the floor of various beds such that communication to the vertical lateral F11 is achieved in each case. The access wells are cased, cemented, and bonded to the walls of the boreholes as previously described. FIG. 6 depicts this scenario two dimensionally.

Access well F2 has a single lateral F21 extending along the floor of a mining bed to communicate with lateral F11. Tubing FA, without packer, is installed from surface into lateral F21 between the access well F2 shoe and connection lateral F11. Mining of lateral F21 utilizes injection and recovery at the shoe of the access well F2, at the tubing FA end and point of communication with lateral F11. Injection and recovery flows are alternated from time to time and tubing FA is retracted, extended or plugged and perforated to improve mining performance.

Access well F3 has a single lateral F31 drilled along the floor of a mining bed such that it communicates with lateral F11 and continues past lateral F11 for substantial distance. Tubing FB, without packer, is installed from surface in lateral F31 via access well F3 to an initial position between the access well F3 shoe and lateral F11. Tubing FC is installed from surface to near the second end of lateral F31. Mining of lateral F31 involves injection and recovery from points at lateral F11, access well F3 shoe, tubing FB and tubing FC. Injection and recovery flows are alternated and the tubing FB and FC are extended, retracted and/or plugged and perforated to improve resource recovery.

Access well F4 has three laterals F41, F42 and F43 drilled along the floor of three mining beds to communicate with lateral F11. Mining is by injecting or recovering from the shoe of lateral well F4 and the communication point with lateral F11. Tubing, packer and plugs arrangements in lateral F11 can force flow mine laterals F41, F42 and F43 independently or in parallel. If mined independently, additional laterals can be drilled and mined after the initial ones are mined out. The number of laterals that can be mined in this manner is not limited to three.

One skilled in the art will understand that the FIG. 6 access wells F2, F3 and F4 examples suggest application of numerous multi-lateral per access well opportunities included in this invention. For example, access well F5 is conventionally drilled vertically, cased and cemented to the top of the multi-bedded evaporite mineral resource in a manner similar to access well F1. Lateral F51 is directionally drilled to curve approximately 90 degrees to become tangent with and extend along the floor of the bed 1 (upper most) to communicate with lateral F11 and extend beyond Lateral F11 as previously discussed for lateral F31. Tubing FD and tubing FE, without packers, are installed and used to mine in the manner described for tubing FB and FC in lateral F31. In this case, there should not be injection and recovery from the shoe of the access well F5 and mining in the curve section of lateral F41 should be avoided by positioning tubing FD following the curve during injection or recovery activity. Likewise, access well F1 should be protected from mining related rock movement by using it and lateral F11 below it for recovery only and by directing tubing FD and FE injection to avoid excessive undermining the area below access well F1.

When mining of lateral F51 is complete, tubing FE is pulled and recovered. Tubing FD is plugged in the second end of the lateral F51 curve, severed just above that plug and also pulled and recovered. The curve above the plug is cemented up to the near the shoe of access well F5. Techniques common in the industry are used to cut and recover the tubing and perform the cementing work. Lateral F52 in now drilled from the shoe of access well F4 a vertical distance and curved in a manner similar to lateral F51 to be tangent with and extend along the floor of bed 2, to communicate with lateral F11 and extend beyond as previously described for lateral F31. Lateral F52 is equipped with tubing, mined, and cemented back in a manner like lateral F51 just described. Lateral F53 is drilled and used to mine bed 3 and its curved section is cemented when mining is completed. This cycle of drilling, mining and cementing back can be repeated for more than the 3 beds used in this example. The access well F5 and its related laterals and mining activity could be repeated in a radial arrangement around the central recovery well F1. In such case, as mining advances outward from the center, recovery per foot of lateral borehole would increase in geometric proportion to the increasing area of a circle. One skilled in the art may find resources are better mined in this manner beginning with the lower beds and working successive laterals and mining upward instead of downward as in this example. In many cases, mining the lower bed first can result in induced roof failure that progressively solution mines the overhead beds without additional drilling.

In another embodiment of the present invention, there is provided a method for solution mining of an evaporite mineral which includes drilling first and second access wells extending into an evaporate mineral formation and drilling first and second substantially parallel lateral boreholes, wherein each lateral borehole has first and second ends, wherein the second ends of the lateral boreholes communicate and wherein the first end of the first lateral borehole communicates with the first access well and the first end of the second lateral borehole communicates with the second access well. The method further includes injecting a fluid into the first access well and collecting a pregnant solution containing a dissolved evaporite mineral from the second access well. In a preferred embodiment, the method further includes injecting a fluid into the second access well and collecting a pregnant solution containing a dissolved evaporite mineral from the first access well. In another preferred embodiment, the first lateral borehole contains at least one first access tubing and the second lateral borehole contains at least one second access tubing and the method further includes injecting a fluid into the first access tubing and collecting a pregnant solution containing a dissolved evaporite mineral from the second access well. In yet another preferred embodiment, this method further comprises injecting a fluid into the second access tubing and collecting a pregnant solution containing a dissolved evaporite mineral from the first access tubing. The method also includes the embodiment wherein the lateral boreholes also communicate via first intermediate positions on each lateral borehole between the first and second ends of each lateral borehole, and the embodiment wherein the lateral boreholes also communicate via second intermediate positions on each lateral borehole between the first and second ends of each lateral borehole.

Figure 7:
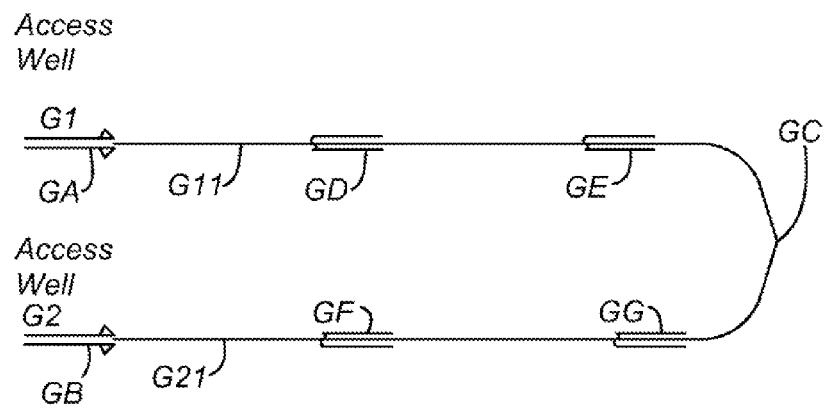
FIG. 7 illustrates an underground configuration of the present invention having two access wells and two lateral boreholes.
Figure 8:
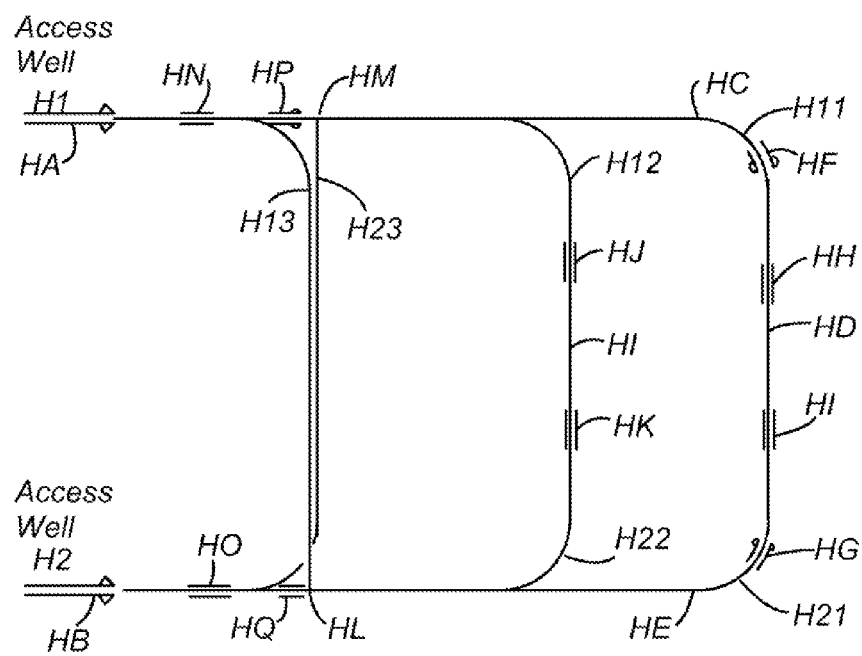
FIG. 8 illustrates an underground configuration of the present invention having two access wells and five lateral boreholes.
Figure 9:
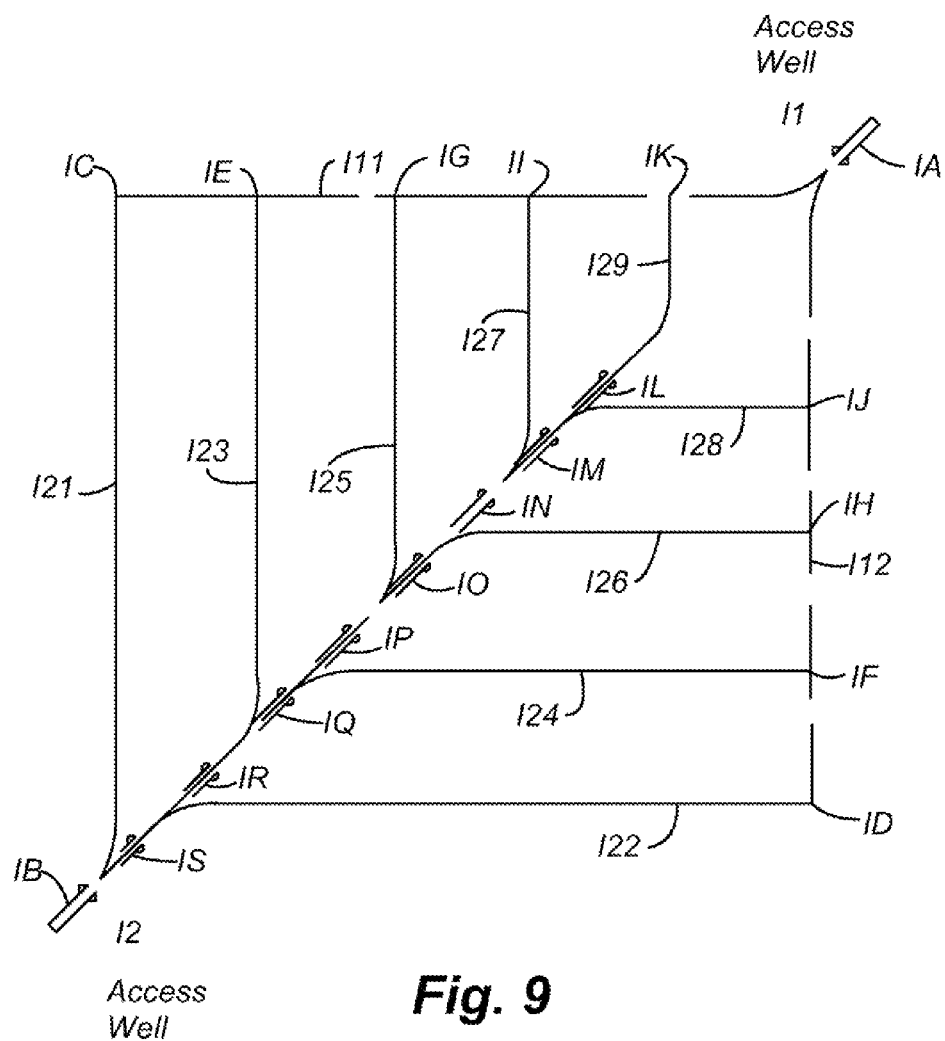
FIG. 9 illustrates an underground configuration of the present invention having two access wells and multiple lateral boreholes.

FIGS. 7, 8 and 9 provide an illustration of particular embodiments discussed in the preceding paragraph. While all of the figures contained within this disclosure are two dimensional, the three dimensional applications will be evident to one skilled in the art. In FIG. 7, a dual access well system for mining a bedded evaporite mineral resource is shown. FIG. 7 could be an overhead or side view relative to the ground surface depending on the resource to be mined and the mine plan. The access wells are drilled, cased and cemented from the shoe upward to the surface. For one scenario the access wells G1 and G2 are conventionally drilled vertically down for some distance. The conventional drilling assembly is then replaced with a directional drilling assembly to advance the access well boreholes in a curve to almost intercept the evaporite mineral formation near the roof line and parallel to each other and at sufficient angle to allow subsequent lateral drilling to become tangent with the base of the evaporite formation to be solution mined. Prior to penetrating the roof of the evaporite mineral formation, the drill is stopped, the directional drilling assembly (not shown) is pulled out and casing GA and GB are installed as shown in the boreholes from slightly above the surface (not shown) to near the end of the boreholes. The casing is then cemented and bonded to the borehole wall, preferably from the end of the boreholes up to the surface. At this point, the lateral boreholes with first connection to an access wells are drilled into the bed to be mined and extended within the bed in accordance with the disposition of the bedded resource to be mined (not shown) and the mine plan. Preferably a smaller diameter directional drilling unit and MWD assembly that can pass within the cased access wells is used to drill the first lateral boreholes G11 and G12 parallel to each other for a substantial distance and then curved to create a curvature of approaching 90 degrees to communicate at point GC. Accordingly, a first end of lateral G11 communicates with access well G1 and a second end of lateral G11 communicates at point 75 with lateral borehole G21, and a first end of lateral G21 communicates with access well G2 and a second end of lateral borehole G21 communicates at point 75 with lateral G11. Tubing GD and GE, without packers, are installed from surface via access well G1 into lateral G11 near the center and second end, and tubings GG and GF, without packers, are installed from surface via access well G2 into lateral G21 with there ends near its center and second end. Mining can be initiated by injection or recovery of solvent from the shoe of access well G1, the shoe of access well G2, the lower end of tubing GD, the lower end of tubing GE, the lower end of tubing GG and/or the lower end of tubing GF. In cases where the injection fluid is at a higher temperature than the recovery fluid temperature and heat exchange is a concern, a preferred mining method is that an access well and all tubing within that access well be used either for injection or for recovery fluids. Lateral borehole segments between potential injection/recovery points can proceed either sequentially, or simultaneously.

In FIG. 8, a dual access well system is shown for mining a bedded evaporite mineral resource with multiple lateral boreholes. The view of the FIG. 8 could be an overhead view relative to the ground surface or a side view depending on the resource to be mined and the mine plan. Dual access wells H1 and H2 are drilled to access an evaporite mineral formation. They are then cased, cemented and bonded to the walls of the boreholes. For one scenario, the access wells are drilled down vertically to the top of an evaporite formation containing bed 1, bed 2, bed 3 and bed 4 (from top to bottom). Prior to penetrating the roof of this bedded evaporite mineral resource, the drill is stopped and pulled out to allow casing HA and HB to be installed in the boreholes from slightly above the surface (not shown) to the end of the wellbores as shown. The casings are then cemented and bonded to the borehole wall, preferably from the end of the drill to up to the surface. At this point, all the lateral boreholes that have a first connection to an access well are drilled preferably using a smaller diameter drilling unit and MWD tool. Lateral H11 is drilled from access well H1 to a point HC and curved about 90 degrees to become tangent with and extend along the floor of bed 4 (not shown) floor a substantial distance to point HD. A second, substantially parallel lateral borehole H21 is drilled from access well H2 to a point HE and curved about 90 degrees such that the lateral H21 becomes tangent with and extends along the floor of bed 4 substantial distance to join lateral H11 in holy communication at point HE. Laterals H11 and H21 can have an angle of intersect that is not evident in this two dimensional figure. Tubing HF and HG, with packers, are installed in lateral H11 and H21 to the roof of bed 4. Tubing HH and HI, without packers, are installed into their respective laterals H11 and H21 below the lower end of tubings HF and HG but short of point HE. The lower ends of tuning HF, HG, HH and HI serve as injection/recovery points for fluids used to mine bed 4 between the lower ends of tubing HF and HG. Injection and recovery flows are reversed from time to time and tubing HH and HI are advanced and refracted or plugged and perforated to improve bed 4 resource recovery.

When lateral H11 and H21 mining of bed 4 is compete, tubing HH and HI are pulled to the surface, a plug is set inside the packers of tubing HF and HG, tubing HF and HG are cut above the plug and pulled to surface allowing cement to be placed on top of the plug to a point above bed 3 that allows new laterals H12 and H22 to be drilled a substantial distance in bed 3 to join in communication at point HI. Tubing HJ and HK are installed in laterals H12 and H22 near but short of point HJ. Bed 3 is solution mined by alternately injecting and recovering from tubing HJ and HK. Tubing HJ and HK are advanced and retracted or plugged and perforated during the mining process to improve mining performance.

When lateral H12 and H22 mining of bed 3 is complete, tubing HJ and HK are pulled to surface and unmined curves of laterals H12 and H22 are plugged and cement is placed on the plugs. The cemented intervals extend upwards into lateral H11 and H21 to a height sufficient to allow new laterals H13 and H23 to be drilled.

Laterals H13 and H23 connect laterals H11 and H21 without connection or communication by utilization of the third dimension not evident in the two dimension FIG. 8. In this view, lateral H13 is drilled from backside of lateral 11 and circles around the far side of plane between lateral H11 and H21 to connect with the backside of lateral H21 at point HL. Lateral H23 is drilled the out the nearside of lateral H21 and circles around the near side of the plane between laterals H11 and H21 to connect with the nearside of lateral H11 at point HM. Laterals H11 and H21 are reopened by drilling below the branch of laterals H13 and H23 to communicate with laterals H13 and H23 at points HL and HM. Tubing HN, without packer, is set in lateral H11 above the branch of H13 from H11. Tubing HO, without packer, is set in lateral H21 above the branch of lateral H24 from lateral H21. Tubing HP, with packer, is set below the branch of H11 and H13 and above the connection of H23 with H11 at point HM. Tubing HQ, with packer, is set below the branch of lateral H21 and H23 and above the connection of lateral H13 with H21 at point HL. The lateral H13 and H23 mining in performed by injecting and recovering from tubing HN, HO, HP and HQ such that lateral H14 and H24 can be mined in sequence, series or parallel with forced flow.

One skilled in the art with knowledge of this invention may find use for more than the two access wells connected in the third dimension. One skilled in the art will recognize the opportunity to drill all the laterals between H11 and H21 before mining and to use various tubing, packer, plug and perforation combinations to mine the various connected laterals in beds in sequence, series or in parallel and distribute the injection and recovery point impacts and cause forced flow in all lateral boreholes in the system. One skilled in the art will see and be able to utilize opportunities to add additional vertical or directionally drilled access wells and primary laterals such as H11 and H21 and laterals in the third dimension including the use of spirals and multiply curved laterals.

In another embodiment of the present invention, there is provided a method for solution mining of an evaporite mineral, which includes drilling at least two access wells extending into an evaporate mineral formation, drilling a first array of at least two substantially parallel lateral boreholes, and drilling a second array of at least two substantially parallel lateral boreholes. In this embodiment, the boreholes in the first array are not parallel with the boreholes in the second array, and the boreholes in the first and second arrays communicate with at least one borehole in the other array or with an access well. The method further includes injecting a fluid into at least one of the access wells, and collecting a pregnant solution containing a dissolved evaporite mineral from at least one of the access wells. Optionally, the method may include drilling a third array of at least two substantially parallel lateral boreholes; wherein the boreholes in each of the arrays are not parallel with the boreholes in any other array; and wherein the boreholes in the first, second and third arrays communicate with at least one borehole in another array or with an access well.

Figure 10:
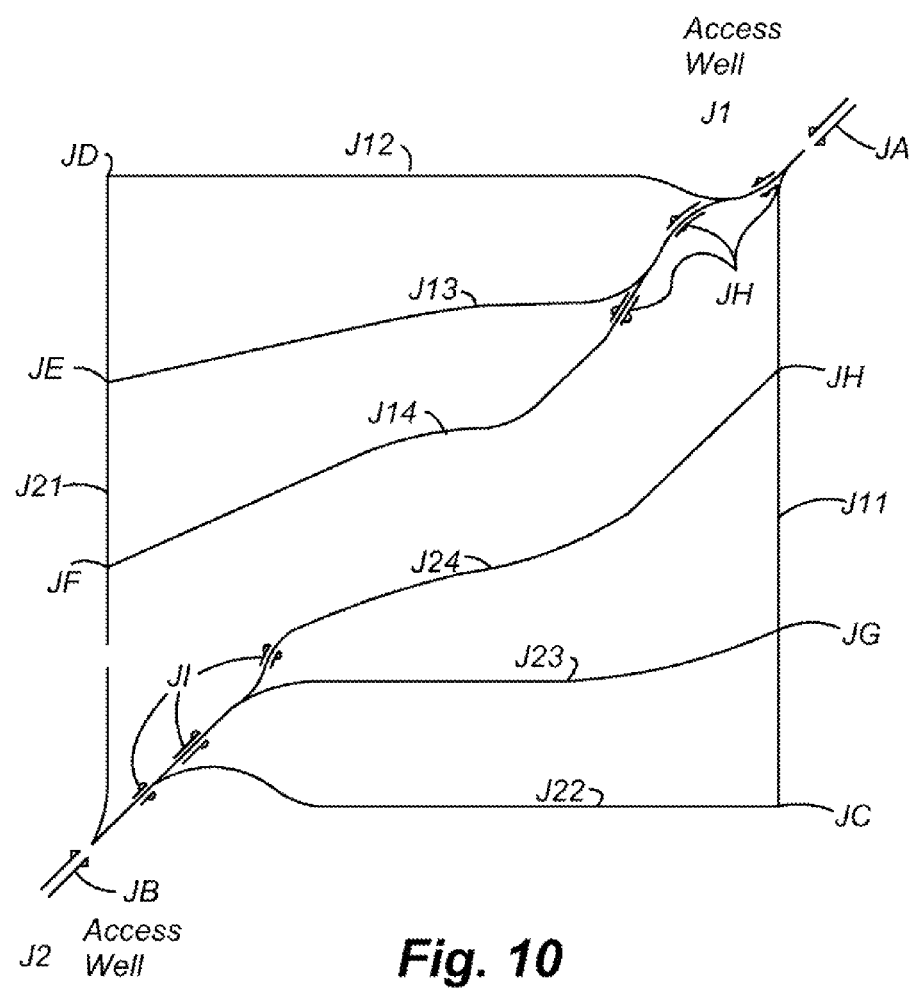
FIG. 10 illustrates an underground configuration of the present invention having two access wells and multiple lateral boreholes.
Figure 11:
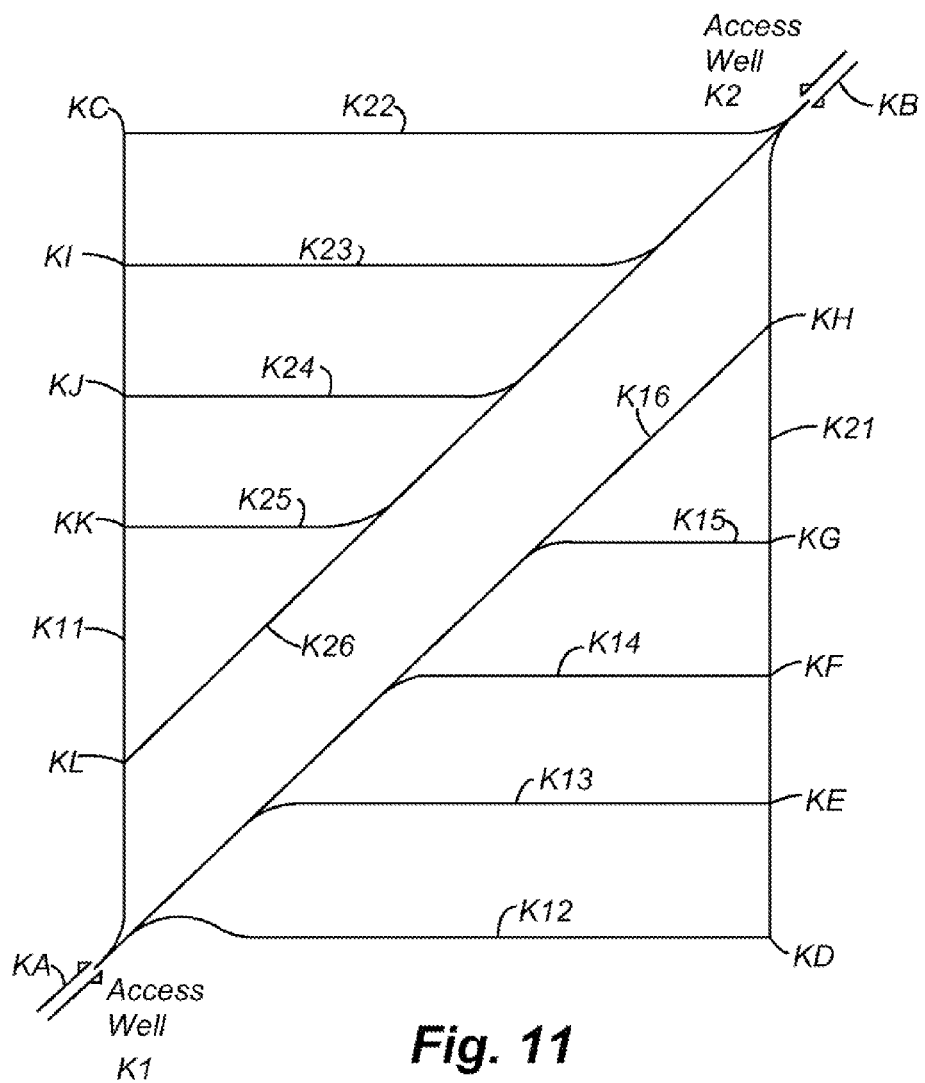
FIG. 11 illustrates an underground configuration of the present invention having two access wells and multiple lateral boreholes.

FIGS. 9, 10 and 11 provide illustrations of particular embodiments discussed in the preceding paragraph. In FIG. 9, a dual access well system is shown for mining a bedded evaporite mineral resource with multiple lateral boreholes. The view of the figure is an overhead view relative to the ground surface. Directionally drilled dual access wells I1 and I2 are drilled to access a bed of an evaporite mineral in a preferred manner. Access wells are drilled, cased and cemented to bond the casing to the borehole. For one scenario the access wells I1 and I2 are initially drilled down vertically and then directionally drilled to turn or curve toward each other from opposing directions and terminate with the access well borehole tangent with the floor of a nearly horizontal bed. The drill string (not shown) is pulled out and casings IA and IB are installed in the boreholes from slightly above the surface (not shown) to the end of the access well borehole as shown. The casings are then cemented and bonded to the borehole wall, preferably from the end of the drill to up to the surface. At this point, all the lateral boreholes which have a first connection to an access well are turned approximately 45 degrees in plan view so that the lateral boreholes are drilled in a substantially horizontal manner relative to the ground surface in accordance with the disposition of the bedded resource to be mined (not shown). Preferably a smaller diameter drilling unit and MWD tool are installed on the drill string and a first lateral borehole I11 is drilled from access well I1 to a point IC and curved to create a curvature of approximately 45 degrees as shown. A second lateral I12 is drilled off the backside of the lateral I11 curve to be substantially perpendicular to lateral I11 to point ID. Lateral I21 is then drilled from access well I2 along the floor of the bed to turn approximately 45 degrees and extend to communicate with lateral I11 at point IC. The directional drilling assembly is pulled back into the lateral I21 curve and used to extend lateral I22 off the backside of the lateral I21 curve. Lateral I22 is drilled toward the shoe of access well I1 for some distance before being turned about 45 degrees opposite the lateral I21 curve and extended to communicate with lateral I12 at point ID. The directional drilling assembly is pulled back into the lateral I22 curve and used to extend lateral I23 off the backside of the lateral I22 curve. Lateral I23 is drilled toward the shoe of access well I1 for some distance before being turned about 45 degrees opposite the lateral I22 curve and extended substantially parallel to lateral I21 to communicate with lateral I11 at point IE. The directional drilling assembly is pulled back into the lateral I23 curve and used to extend lateral I24 off the backside of the lateral I23 curve. Lateral I24 is drilled toward the shoe of access well I1 for some distance before being turned about 45 degrees opposite the lateral I23 curve and extended substantially parallel to lateral I22 to communicate with lateral I21 at point IF. The directional drilling assembly is pulled back into the lateral I24 curve and used to extend lateral I25 off the backside of the lateral I24 curve. Lateral I25 is drilled toward the shoe of access well I1 for some distance before being turned about 45 degrees opposite the lateral I24 curve and extended substantially parallel to lateral I23 to communicate with lateral I11 at point IG. The directional drilling assembly is pulled back into the lateral I25 curve and used to extend lateral I26 off the backside of the lateral I25 curve. Lateral I26 is drilled toward the shoe of access well I1 for some distance before being turned about 45 degrees opposite the lateral I25 curve and extended substantially parallel to lateral I24 to communicate with lateral I21 at point IH. The directional drilling assembly is pulled back into the lateral I26 curve and used to extend lateral I27 off the backside of the lateral I26 curve. Lateral I27 is drilled toward the shoe of access well I1 for some distance before being turned about 45 degrees opposite the lateral I26 curve and extended to communicate with lateral I21 at point II. The directional drilling assembly is pulled back into the lateral I27 curve and used to extend lateral I28 off the backside of the lateral I27 curve. Lateral I28 is drilled toward the shoe of access well I1 for some distance before being turned about 45 degrees opposite the lateral I27 curve and extended substantially parallel to lateral I26 to communicate with lateral I21 at point IJ. The directional drilling assembly is pulled back into the lateral I28 curve and used to extend lateral I29 off the backside of the lateral I28 curve. Lateral I29 is drilled toward the shoe of access well I1 for some distance before being turned about 45 degrees opposite the lateral I28 curve and extended to communicate with lateral I21 at point IK.

Tubing IL, with packer, is installed in the first end of lateral I29 and is used to inject fluids that mine I29 and a portion of I11 with recovery is at the shoe of access well I1. Laterals I29 is mined with forced flow that can be reversed from time to time to improve mining performance. A second tubing from surface via tubing IL can be extended into the lateral I29 to further distribute the injection point impacts.

When lateral I29 mining is complete, a plug is set inside the tubing IL packer. Tubing IL is cut and pulled to the surface leaving a section of the IL tubing, packer and plug to seal in the mined out I29 lateral. Tubing IM, with packer, is installed in first end of lateral I28 and used to mine lateral I28 and a portion of I12 in a manner tubing IL and lateral I29. This process is repeated with tubing IN, IO, IP, IQ, IR, and IS to mine laterals I27, I26, I25, I24, I23, I22 and I21 respectively. In many cases, a single tubing with a series of packers using plugs and perforations can be used to individually mine all the lateral independently with forced flow without the effort of replacing the tubing and packer each time a lateral is mined out. One skilled in the art with knowledge of this invention can develop alternative lateral borehole and tubing arrangements including the use of tubing and packers in lateral L11.

In FIG. 10, a dual access well system is shown for mining an evaporite mineral resource with multiple lateral boreholes. In FIG. 10, a dual access well system is shown for mining a bedded evaporite mineral resource with multiple lateral boreholes. The view of the figure is an overhead view relative to the ground surface. Directionally drilled dual access wells J1 and J2 are drilled to access a bed of an evaporite mineral. Access wells are drilled, cased and cemented such that laterals can be extended into the mining zone. For one scenario the access wells J1 and J2 are initially drilled down vertically and then directionally drilled to turn or curve toward each other from opposing directions and terminate with the access well borehole tangent with the floor of a nearly horizontal bed. The drill string (not shown) is pulled out and casings JA and JB are installed in the boreholes from slightly above the surface (not shown) to the end of the access well borehole as shown. The casings are then cemented and bonded to the borehole wall, preferably from the end of the access well borehole to up to the surface. At this point, all the lateral boreholes which have a first connection to an access well are turned approximately 45 degrees in plan view so that the lateral boreholes are drilled in a substantially horizontal manner relative to the ground surface in accordance with the disposition of the bedded resource to be mined (not shown). Preferably a smaller diameter drilling unit and MWD tool are installed on the drill string and a first lateral borehole J11 is drilled from access well J1 to create a curvature of approximately 45 degrees in the plan view and extended to point JC. A second lateral J12 is drilled off the backside of the lateral J11 curve to be substantially perpendicular to lateral J11 and extended to point JD. Lateral J13 is drilled of the backside of the lateral J12 curve and drilled toward the shoe of access well J2 some distance where it is turned in the plan view about 45 degrees and extended to point JE. The directional drilling assembly is returned to the J13 curve where it is used to drill lateral J14 off the backside of lateral J13 curve toward the shoe of access well J2 some distance and then lateral J14 curves and communicates with lateral J21 at point JF. Lateral J21 is then directional drilled from access well J2 turning in plan view to create a curvature of about 45 degrees while drilling along the floor of the bed and is extended to communicate with lateral J14 at point JF and then with J13 at point JE and finally lateral J12 at point JD. The directional drilling assembly is pulled back into the lateral J21 curve and used to drill lateral J22 off the backside of the lateral J21 curve. As lateral J22 is drilled along the floor of the bed, it is turned in plan view, opposite the lateral J21 curve, to be perpendicular to lateral J21 and extended to communicate with lateral J11 at point JC. The directional drilling assembly is pulled back into the lateral J22 curve and used to drill lateral J23 off the backside of the lateral J22 curve. Lateral I23 is drilled along the floor of the bed toward the shoe of access well J1 for some distance and then turned about 45 degrees in the same direction as lateral J22 and extend to communicate with lateral J11 at point JG. The directional drilling assembly is returned to the J23 curve where it is used to drill lateral J24 off the backside of lateral J23 curve toward the shoe of access well J1 some distance and then lateral J23 curves and communicates with lateral J11 at point JH.

Tubing JH with three packers is installed to the first end of lateral J14 such that packer one is set in the first end of lateral J14; packer two is set in the first end of lateral J13; and packer three is set in the first end of lateral J12. Tubing JI, with three packers, is installed in lateral J24 such that packer one is set in the first end of lateral J24; packer two is set in the first end of lateral J23; and packer three is set in the first end of lateral J22.

A potential mining method is mining lateral J14 by injecting from the open end of tubing JH and recovery at the shoe of access well J2. When lateral J14 is mined out, a plug is set tubing JH packer one and tubing JH is perforated following packer two to initiate flow and mining in lateral J13 while recovering from the shoe of access well J2. When lateral J13 is mined out, a plug is set in tubing JH packer two and tubing JH is perforated following packer one to allow injection of mining flows into lateral J12. When lateral J12 is mined out, injection begins at the open end of tubing JI into lateral J24. Similar plugging and perforating steps are used to mine laterals J23 and J22. One skilled in the art can apply flow switching and other tubing, packer and plug and perforation arrangements and plugs can be installed and removed to facilitate additional recovery.

In FIG. 11, a dual access well system is shown for mining a bedded evaporative resource with multiple lateral boreholes. The view of the figure is an overhead view relative to the ground surface. Directionally drilled dual access wells K1 and K2 are drilled to access an evaporite mineral formation. The access wells are cased, cemented, and bonded to the walls of the boreholes. For one scenario the access well is initially drilled down vertically and then is turned or curved to almost intercept the evaporite mineral formation near the roof line. Prior to penetrating the roof of the evaporite mineral formation, the drill is stopped. Drill string (not shown) is pulled out and casing KA and KB are installed in the boreholes from slightly above the surface (not shown) to the end of the well bore as shown. The casing is then cemented and bonded to the borehole wall, preferably from the end of the casing shoe to up to the surface. At this point, all the lateral boreholes which have a first connection to an access well are turned approximately 90 degrees to the surface so that the lateral boreholes are drilled in a substantially horizontal manner relative to the ground surface in accordance with the disposition of the bedded resource to be mined (not shown). Preferably a smaller diameter drilling unit and MWD tool are installed on the drill string and a first lateral borehole K11 is drilled along the bed floor while curved about 45 degrees from access well K1 to a point KC. A second lateral K12 is drilled from the backside of the lateral K11 curve along the bed floor while curving opposite the lateral K11 curve to be substantially perpendicular to lateral K11 and extend to point KD. Additional lateral boreholes K13, K14, K15, K16, shown, are drilled in like manner to points KE, KF, KG and KH respectively. Access well K2 laterals K21, K22, K23, K24, K25 and K26 are drilled in like manner to points KC, KI, KJ, KK and KL. Accordingly, the first end of lateral borehole K11 communicates in order with access well K1 and the second ends of laterals K26, K25, K24, K23 and K22 at points KL, KK, KJ, KI and KC respectively; the first end of lateral borehole K12 communicates with the curve of lateral K11 and its second end communicates with lateral K21 at point KD; the first end of lateral K13 communicates with the curve of lateral K12 and its second end communicates with the lateral K21 at point KE; the first end of lateral K14 communicates with the curve of lateral K13 and its second end communicates with lateral K21 at point KF. in order with access well and laterals; the first end of lateral K15 communicates with the curve of lateral K14 and its second end communicates with lateral K21 at point KG and the first end of lateral K16 communicates with the curve of lateral K15 and its second end communicates with lateral K21 at point KH. Access well K2 laterals K21, K22, K23, K24, K25 and K26 communicate in a like manner as shown. Tubing, packers, plugs and perforations can be used as previously described to mine each lateral with forced flow. Access well shoes and tubing (not shown) may be used to inject or recover mining fluids at various points in the lateral system. Mining can progress either from one lateral to another sequentially, or simultaneously among all of the boreholes. Tubing, tubing packers and plugs can be used to distribute the injection and recovery point impacts and cause forced flow in all lateral boreholes in the system.

Figure 13:
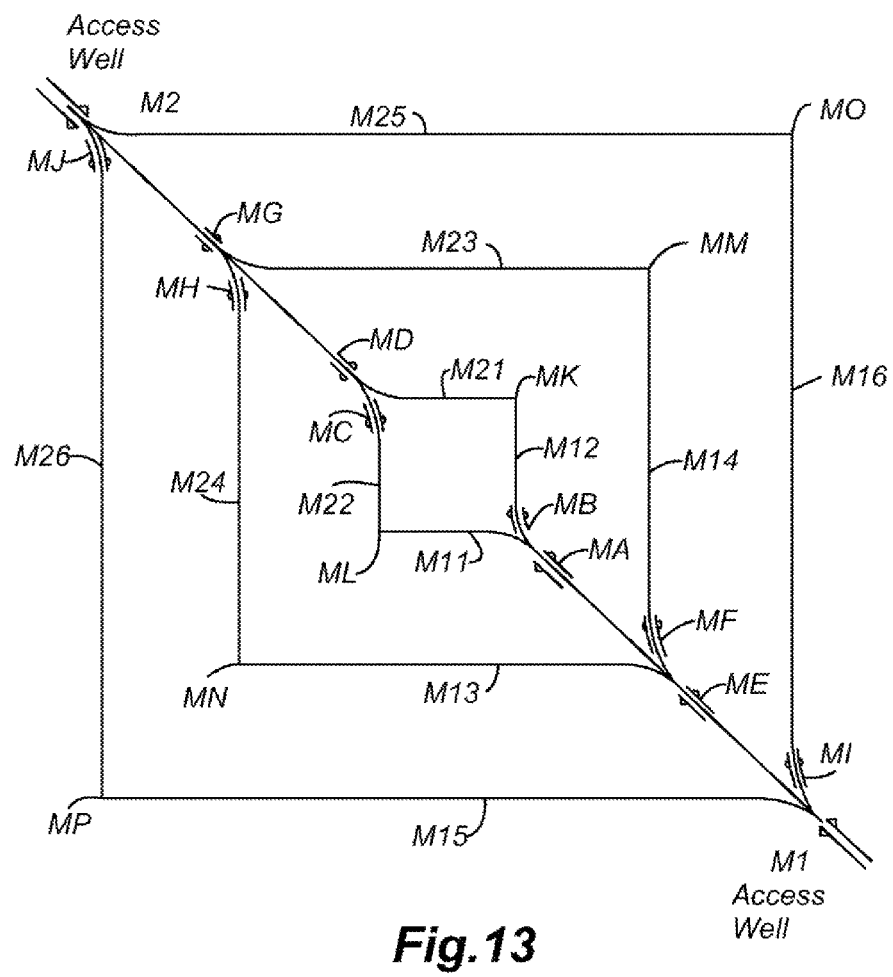
FIG. 13 illustrates an underground configuration of the present invention having two access wells and multiple lateral boreholes.

In FIG. 13, a dual access well system is shown for mining a bedded evaporative resource with multiple lateral boreholes. The view of the figure is an overhead or side view relative to the ground surface. Directionally drilled dual access wells M1 and M2 are drilled to access an evaporite mineral formation. The access wells are cased and cemented to bond the casing to the walls of the boreholes. For one scenario the access well is initially drilled down vertically and then is turned or curved to intercept the evaporite mineral formation. When the access well borehole is tangent with the floor of the bed, drilling is stopped. The drilling assembly is pulled out and casing is installed in the boreholes from slightly above the surface (not shown) to the end of the well bore as shown. The casing is then cemented and bonded to the borehole wall, preferably from the end of the casing shoe to up to the surface. At this point, the laterals M11 and M21 that have a first connection to an access well are drilled along the floor of the bed toward the opposing access well some distance and then turned opposite directions about 45 degrees and extended to point ML and MK respectively. A second lateral M12 is drilled from the backside of the lateral M11 curve and is extended along the bed floor while curving opposite the lateral M11 curve to be substantially perpendicular to lateral M11 and extend to connect in communication with lateral M21 at point MK. Lateral M22 is drilled off the backside of the lateral M21 curve along the floor of the bed to become substantial perpendicular to lateral M21 and is extended to connect in communication with lateral M11 at point ML. Tubing MA, with packer, is installed just before the lateral M11 and M12 branch. Tubing MB, with packer, is installed in the curve of lateral M12. Tubing MC and MD, with packers, are installed in similar manner as shown. Mining can progress injecting and recovering from the open ends of tubing MA, MB, MC and MD until laterals M11, M12, M21 and M22 are mined out. At that pint tubing MB and MC are cut above the packers and pulled from the wells. A plug is set in the packers of tubing MA and MD, before they are cut and pulled from the wells. Laterals are drilled and mined using tubing ME, MF, MG and MH in like manner. When laterals M13, M23, M14 and M24 are mined out, there related tubing is plugged removed as previously described and laterals M15, M16, M25 and M26 are drilled. Tubing MI, with packer is installed from surface and is set in the lateral M16 curve. Tubing MJ, with packer, is installed from surface and is set in the curve of lateral M26. Laterals M15, M16, M25 and M26 are mined with injection and recovery from the shoes of the access wells M1 and M2 and the open ends of tubing MI and MJ. Any number of substantially square or rectangle or round sets of laterals can be completed and mined in his manner, including those beginning from windows milled in the cased and cemented access wells M1 and M2. The substantially square, rectangle or round sets of laterals need not be in the same plane as shown on the two dimensional figure. The tubing, packer and plug arrangement shown provides a forced measured flow to mine each lateral. One skilled in the art with knowledge of this invention can reduce or expand the tubing, packer and plug arrangement.

The present invention also includes method for solution mining of an evaporite mineral which includes drilling at least one access well accessing an evaporate mineral formation and drilling a first and second lateral boreholes. The two lateral boreholes communicate with each other and at least one of the lateral boreholes is connected to the at least one access well. The method further includes injecting a fluid into the at least one access well and circulating the fluid through the first lateral borehole to produce a first pregnant solution containing a dissolved evaporite mineral to produce a first cavity, and collecting the second pregnant solution. The method further includes circulating the fluid through the second lateral borehole to produce a second pregnant solution containing a dissolved evaporite mineral to produce a second cavity and collecting the pregnant solution. In a preferred embodiment, the method further includes circulating the fluid through the second lateral borehole after said step of circulating the fluid through the first lateral borehole, and said first lateral borehole is below said second lateral borehole. In another preferred embodiment, the barrier that exists between the first cavity and the second lateral borehole collapses and such collapse opens a communication between the first cavity and the second borehole.

One example of use of sequential mining utilizing a natural barrier to favorably influence solution mining is a trona resource with a 5-foot lower bed, and 25-foot upper bed and a separating 7-foot shale layer. The lower 5-foot bed may be solution mined first from a lateral borehole placed within that bed. The 7-foot shale natural barrier halts upward leaching causing the mining solutions to more actively leach the walls to widen the cavity within the 5-foot bed. Such a method improves the recovery from the 5 foot lower bed and widens the cavity in the 5-foot bed to undercuts the 7 foot barrier and eventually causing it to fail. Failure can be either an advancing rubblization of the shale or failure as a structural beam. The 25-foot upper bed may fail at the same time as the 7-foot barrier or may stay in place for a period of time. Either way, introduction of the ore in the 25-foot bed to the top of the actively mined cavity occurs in such a manner such that nearly 100% recovery is possible at least for the full width of the cavity in the 5-foot bed. If a mine plan calls for failure of the 7-foot barrier at a specific point in the mining process, cycling the cavity pressure and/or heating the barrier can stimulate failure. Accordingly, to mine such a resource, the at least two lateral boreholes may be disposed substantially vertically with respect to each other, and the lowest lateral borehole may be substantially completely solution mined before an upper lateral borehole is substantially completely solution mined. Plugs may be disposed within at least one lateral borehole to allow sequential mining of the boreholes.

In another embodiment of the invention, the present invention also provides a method for solution mining of an ore mineral formation, which includes drilling at least one access well accessing the ore mineral formation and drilling at least two lateral boreholes, each containing a first end connected to the access well and a second end not in borehole communication with the access well or another lateral borehole. The method further includes injecting a fluid into an access well causing fluid flow within said ore mineral formation and collecting a pregnant solution containing a recovered ore mineral from at least one lateral borehole. The lateral boreholes communicate on a first end with either an access well or a lateral borehole, but on a second end, the lateral boreholes are in fluid communication only through fluid flow that has permeated through the solid rock matrix containing the ore mineral. There are no direct borehole connections between the second ends of each lateral borehole and any other borehole.

The ore mineral formation includes a permeable rock which includes the ore mineral, such as, for example, a permeable sandstone resource containing uranium minerals. A preferred ore mineral to collect or recover contains uranium. Preferably, at least a portion of the at least two lateral boreholes are substantially parallel to each other. In another preferred embodiment, at least a portion of the lateral boreholes and the at least one access well are substantially parallel to each other, i.e., are positioned in the same axial orientation as each other.

In another preferred embodiment, at least a portion of the lateral boreholes and the at least one access well are drilled so that a substantial portion of the boreholes are substantially perpendicular with respect to the ground surface.

Figure 12:
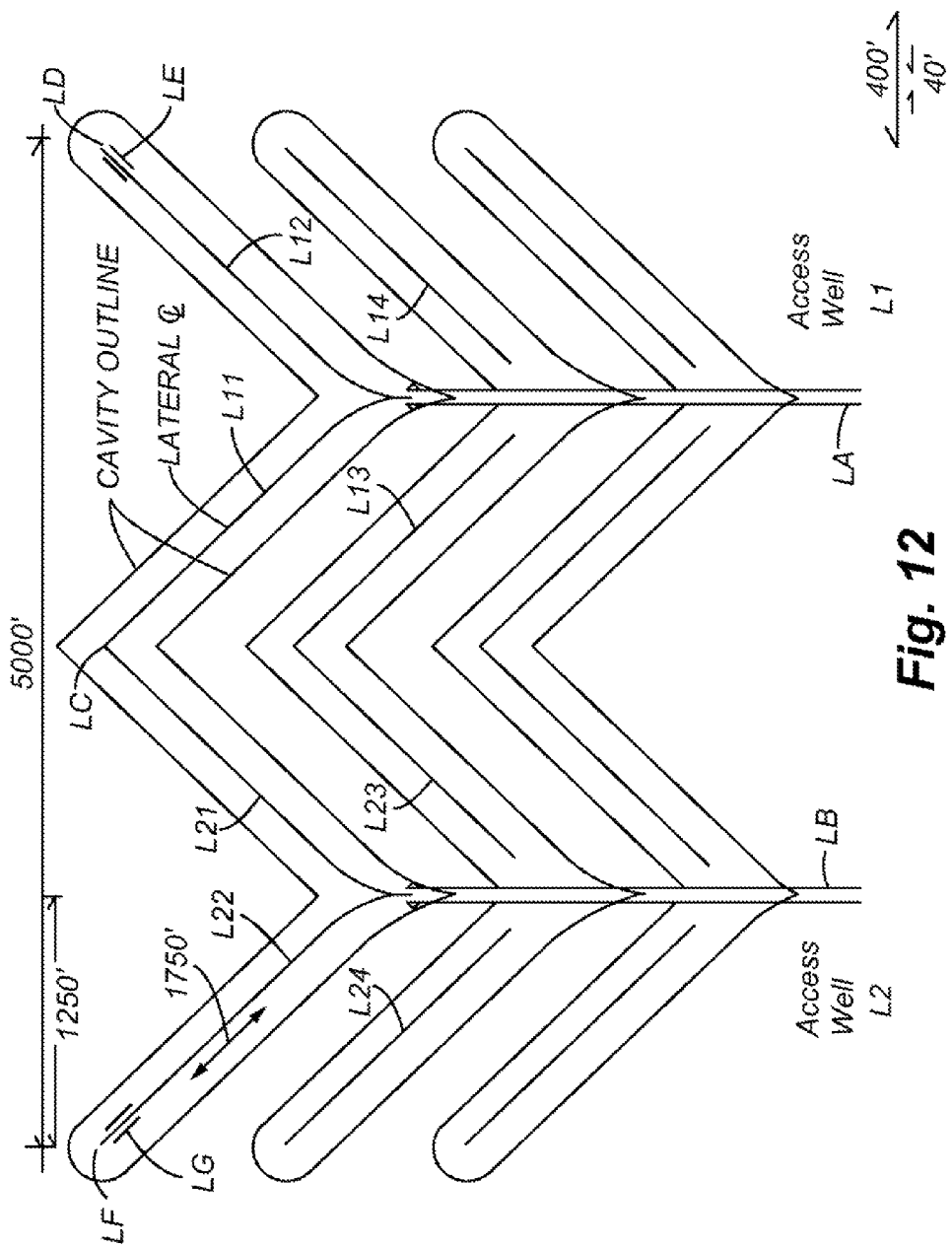
FIG. 12 illustrates an underground configuration of the present invention having two access wells and multiple lateral boreholes.

FIG. 12 illustrates a dual access well solution mining system for evaporate resources using with lateral boreholes which may be mined in a successive fashion. The view of the figure is a plan view relative to the ground surface. The dual access wells L1 and L2 are drilled to access an evaporite mineral formation. Access wells are cased and cemented to bond the casing to the borehole. For one scenario a pair of the access wells are initially drilled down vertically and then turned or curved by directional drilling to intercept the evaporite mineral formation and become tangent at point LA and LB with the floor of a bed selected for solution mining. Drilling of the access well boreholes continue along the bed floor for a substantial distance being substantially parallel to each other. The drill string and directional drilling assembly (not shown) is pulled out and casing is installed from slightly above surface to near the end of the boreholes extended along the floor of the selected bed and as shown. The casing is then cemented and bonded to the borehole wall, preferably from the end of the drill to up to the surface. Preferably a smaller diameter drilling unit and MWD tool are installed on the drill string and a first lateral borehole L11 is drilled from the shoe of the access well L1 and is curved at about a 45 degree angle from an extended centerline of the access well and extended along the floor of the bed to a point LC that is about halfway between the pair of access well L1 and L2. The directional drilling assembly is retracted to the first end of lateral L11 and used to drill lateral L12 off the backside of the lateral L1 curve. Lateral L12 is curved as shown about 45 degrees from the extended centerline of access well L1 in the opposite direction as lateral L11 and extended along the floor of the bed a substantial distance to point a LD. The length of all the lateral boreholes in this Figure is approximately 1750 feet. Tubing LE is installed from slightly above surface to near point LD at the second end of lateral L12. Lateral L21 is now drilled from the shoe of access well L2 turning about 45 degrees from the extended centerline of the access well and extended along the floor of the bed to communicate with lateral L11 at point LC. The drill is returned to the shoe of access well L2 and a lateral L22 is drilled off the backside of the lateral L21 curve to turn about 45 degrees relative to the extended centerline of the access well and extend along the floor of the bed to point LE. Tubing LG is installed from slightly above surface to near the end of lateral L22 at point LE. Solution mining may commence at this point by injecting and recovering from the shoes of access wells L1 and L2 and from the ends of tubing LE and LG and using flow reversal as well as tubing relocation, plugging and perforating to improve mining performance. When lateral L11, L12, L21 and L22 lateral mining is complete, a plug is set in the access well L1 casing near its shoe and the well is prepared for drilling the next set of laterals for mining cutting a window in the access well casing about 300 feet back from the plugged end. Preferably the plug is drillable. From this window, laterals are drilled and mined in a manner similar to the first set L11, L12, L21 and L22. This retreat drilling and mining process can be repeated many times. Tubing and tubing packers can be used to distribute the injection and recovery point impacts and cause forced flow in all lateral boreholes in the system. Where mining benefits from more injection and recovery point in the laterals being mined, commonly used techniques can be used to place more than one tubing into the laterals L12 and L22. Less common but available techniques can also be used to gain tubing access to the laterals L11 and L21 in addition to laterals L12 and L22. In the access well, tubing to the first drilled laterals L11 or L21 would parallel the tubing that extends to the second drilled laterals L12 or L22. The techniques used to drill multiple laterals from the shoe of an access well in a manner that allows placement of tubing in each lateral is an example of emerging drilling and completion techniques and practices that one skilled in the art can adapt to enhance the efficacy of the invention.

In another embodiment of the present invention, a method of constructing an underground configuration is provided. This method includes drilling at least one access well and drilling at least two lateral boreholes. At least two lateral boreholes communicate with each other and at least one of the lateral boreholes is connected to the access well. Such an underground configuration allows for substantially equal or controlled fluid flow throughout the lateral boreholes, and will have many non-solution mining applications. A few embodiments of non-solution mining are described below, but more will occur to those of skill in the art.

In one preferred embodiment, the underground configuration is a water well providing improved access and flow from an underground water source. Methods known in the art for water well drilling may be used in conjunction with this method.

In another preferred embodiment of an underground configuration, the underground configuration is used for mining an evaporite ore mine, oil shale mine, a tar sand mine, and a coal mine. In the case of oil shale, there have been numerous failures to economically mine oil shale. A number of preexisting methods of mining oil shale, such as the methods taught by U.S. Pat. No. 3,967,853, which is incorporated by reference herein in its entirety, are compatible with methods of constructing an underground configuration. Such methods include in situ production using hot fluid-induced pyrolysis or thermo or anaerobic microorganism conversion of the organic solids to fluids. Similarly, this invention may be used in conjunction with known methods of mining and recovering from tar sands or from coal mines.

In another preferred embodiment, the underground configuration of the present invention may be used to clean and/or contain threatening subterranean fluids such as toxic chemical plumes adjacent to underground aquifers.

In another preferred embodiment, the underground configuration of the present invention may be used for subterranean storage and/or disposal of materials. An underground configuration may be adapted to increase the volume of space available for storage and/or disposal relative to a given amount of underground area, relative to presently known subterranean storage configurations. Drilling and the number of lateral boreholes drilled are adapted in light of the ability of the underground formation to support multiple boreholes without danger of subsidence or collapse. Preferred substances to store and/or dispose include gases such as natural gas and liquids such as coal bed methane production waste waters.

The following example is provided for the purpose of illustration and is not intended to limit the scope of the present invention.

Example 1

The following describes an application of this invention to mine Wyoming's Green River Basin trona and produce various sodium products. All depths are from surface. All temperatures and concentrations are "about" that provided in the discussion. The resource is defined as barren from the land surface down to the top of Bed 17 at a depth of 1543-ft. Moving downward from the top of Bed 17 the trona rich beds that are less than 2% salt are characterized as: (11' Bed 17) (42' barrier) (3' Bed 16) (6' barrier) (5' Bed 15) (42' barrier) (138' intermingled bedded mixed trona and salt and barriers) (4' barrier) (5' Bed 7) (7' barrier) (8' Bed 6) (6' barrier) (9' Bed 5) (23' barrier) (10' Bed 4) (9' barrier 3) (7' Bed 3) (19' barrier) (13' Bed 2) (15' barrier) and (3' Bed 1). The beds dip deeper to the north at a rate of 2' per 100'. The in situ temperature at 2,000-foot depth is 95° F. In this evaluation, production of 95 lbs of salable sodium sesquicarbonate (recrystallized trona) per cubic foot of trona bed consumed by the solution mining process is estimated. Included in this estimate is not producing 10% of the trona dissolved as it remains dissolved in the massive amount of mining fluid remaining in the mined out cavity. Recovery of 105 lbs of salable sodium sesquicarbonate can be achieved by recovering and processing this final cavity solution.

A novel plan to improve resource recovery, conserve water and gain additional economic value from a cavity is pushing the final cavity solution out of the cavities with compressed natural gas in the summer as an initial phase of a natural gas storage project. Fresh water could be used to push the natural gas out of the cavity as desired during the higher value peak demand season. Given the long dissolution period, the solutions produced during the gas storage phase would saturate each cycle. Allowance for this additional cavity growth is an important natural gas storage project design. Presaturated solution could be used to control the additional cavity growth if desired.

Retired cavities are also used to pre-treat the raw water entering the sodium production facilities. Passing the raw makeup water though an old cavity would clarify the raw water, eliminate the Ca and Mg ions by carbonate precipitation and increase the productivity of the facilities by presaturating the process make-up water. The vast amount of solution stored in the cavity would act as a secure water supply in much the same way as a surface reservoir.

This trona resource will be mined in this example using the dual well method as shown by FIG. 12. All casing sizes are approximate. A pair of 1,000' deep vertical 14" cased and cemented access wells, L1 and L2, are spaced East-West a distance of 2,500'. Laterals LA and LB are then directionally drilled curving toward the north from each of the two access wells L1 and L2 to become tangent with and run for 1,120' just above the base of Bed 15. A 12" casing is run to the bottom (far end) of LA and LB boreholes and cemented in place continuously along the 1,120' length on the floor of Bed 15 and several hundred feet upward into the lower portion of the curve. The 12" casing is set in the well head under tension such that no slack can occur when heated to 300° F. Tubing packers in the 12" casing system can replace some or all the cement to allow more flexible and lower cost recompletion as mining advances cavity to cavity using this well pair.

From the lower end of LA and LB, directionally drill laterals L11 and L21 along the floor of Bed 15 while building 45° of angle toward each other and then extend each to the half way point between the two wells so that they hydraulically intersect at the mid-point. Jet washing or fracing can assist gaining hydraulic connection if necessary. From LA and LB drill second laterals L12 and L22 in a similar manner as the first directional laterals but in the opposite direction, and extend each a distance of 1800 feet. Complete these opposing laterals by running a 8" tubing to the end of L12 and L22 Equip each of the wellheads with automated flow control valves, sample ports, and instrument package (flow rate, temperature, specific gravity and pressure) such that each of the 8" tubings and 12" casings can be used to inject or recovery solutions. In this the hot solution mining example, the heat exchange potential of the tubing and casing is such that simultaneous same well injection and recovery is avoided.

Mining is initiated with ambient temperature water followed by about 90° C. solvent containing about 8% by weight soda ash to avoid secondary precipitation of Wegscheiderite or nahcolite. Injection and recovery is alternated between well LA and LB at about 2 day intervals or anytime flow restriction is noted. Operate in this manner to build an insoluble debris pile covering each injection/recovery point forming the equivalent of a water well gravel pack. This phase is complete when recovery and resource based calculations indicate several feet of insoluble rubble has formed at each of the injection/recovery points. The flow rate during this period is about 500 gallons per minute.

Commercial operation is initiated by switching to water injection and ramping up the flow rate and temperature to 2,000-gpm and a recovery temperature about 5° C. above the TWA point. The TWA temperature and dissolved solid concentrations shown in FIG. 14 are not exact and can shift with impurities concentrations. One skilled in the art can better identify the TWA point in the lab and by determining the temperature of maximum concentration of dissolved solids in the recovered solutions when operating nearly saturated along the trona—Wegscheiderite solid phase boundary. Above the TWA temperature, increased temperature will decrease the solution concentration of solid materials. Below the TWA temperature, deceased temperature will also decrease the solution concentration of solid materials. The TWA point should be approached from the high temperature side so that cooling of the solutions in transport to the plant are less likely to cause super saturation and potential precipitation plugging of the recovery well and pipeline.

Initially, solution mining is contained in the 5' thick Bed 15. When flow, temperature and concentration have stabilized for a few weeks, reverse the flows at the wellheads and sample and assay the freshly returning recovery flows during the transition period to gain the data needed to estimate the relative leach rate for various sections of the cavity. Using the relative leach rate data, allocate production to each cavity section and estimate the cavity production and profile in each section. Based on data and calculations, adjust the injection and recovery flow rates and switch injection and recovery flow directions in a manner designed to balance the recovery in the 7,000 feet of borehole in this cavity.

To the extent possible, use steady pressures and temperatures to mine as much as possible from Bed 15 before the failure of the its 6' roof that introduces Bed 16 to the expanding cavity. In a similar way, mine the combined Bed 15 and 16 system until the 42' Bed 16 roof fails introducing Bed 17 to the expanding cavity. The mining process continues with Beds 15, 16 and 17 actively combined in single mining cavity. The combined trona bed thickness of bed 15, bed 16, and bed 17 noted above is 19-feet. The total mining borehole length of lateral L11, L12, L21 and L22 is about 7000-feet without including the several hundred feet of rounding that mining adds to the cavity length. When an effective average cavity width of 200-feet is achieved, 27-million cubic feet of ore has been mined (7000' by 200' by 19'). At 95-pounds of trona production per cubic foot of trona ore mined means that the initial borehole L11, L12, L21 and L22 yield from the Bed 15, 16 and 17 mining interval produced 1.3 million tons of sesquicarbonate (recrystallized trona) on surface without harvesting a final solution Mining will continue as long as economic heat loss and solution concentrations continue and subsidence potential is acceptable. For this example, this cavity is shut in at this point and mining advances to the next cavity by recompleting the wells.

When initial (lateral L11, L12, L21 and L22) bed 15, 16 and 17 cavity mining is complete, the 8-inch tubing is recovered and the 12" casing is plugged near the shoe. Then a window is milled about 600-feet back from the shoe and a new set of interconnected and opposing laterals are drilled, completed and mined. FIG. 12 notes these as laterals L13, L14, L23 and L24. FIG. 12 shows two such pullback cycles and three cavities mined by this set of access wells. More are possible if spaced closure or the 12' casing were extended a greater distance along the floor of Bed 15. If all three cavities were shut in at a 200-ft effective width, the combined production from the three cavities in bed 15, 16 and 17 mining interval is about 4-million tons.

When the Bed 15, 16 and 17 mining with this set of wells is complete, the 12-inch casing is plugged and severed at the top of its cemented interval. The 12-inch casing is recovered from the well and the open hole below the 14-inch casing shoe is cemented. This allows a second drilling and mining phase to produce the bed 1, 2, 3, 4, 5, 6 and 7 mining interval in the same manner as the overhead interval Bed 15, 16 and 17.

The combined trona bed thickness of this lower mining interval is 55-feet or 2.9 times that of the 19-feet combined bed thickness of the upper mining interval. The mining potential of the lower interval is at least 3 times that of the upper or nearly 12-million tons. However, if the mine plan requires salt avoidance, mining may be terminated when roof falls expose the overhead salt above Bed 7. The volume of solvent filling the mined cavity is large and can accept large volumes of salt before becoming too salty. Should salt concerns eliminate mining of the top 3 beds of the 7 beds lower mining interval, its potential is reduced from 12 to 7 million tons.

If 4,000,000-tons were recovered from the three cavity upper mining interval and 7,000,000 to 12,000,000 tons are recovered from the lower mining interval the total recovery of this well pair is 11 to 16 million tons of trona produced on surface assuming the ore is 90% pure and without harvesting the 10% of the possible production contained in the final shut-in cavity solution.

Salt need not terminate mining. Significant soda ash is dissolved even in salt saturated aqueous solutions. Sufficient hydroxide (OH) can be added to the injected solvent to chemically convert the bicarbonate to soda ash at the point of dissolution resulting in salt brine that is rich in soda ash. The soda ash can be produced with or without co-producing salt using known processes. Other known processes avoid the use of hydroxide. For example, salt saturated solutions will dissolve trona while subsequently precipitating excess sodium bicarbonate in the cavity to provide a soda ash rich production solution Mine plans that do not require salt avoidance can skip mining the upper interval and initiate solution mining in Bed 1 and progressively mine all overhead beds without significant additional drilling or recompletion. Such a salty mine plan simplifies and lowers the cost of drilling and mining and allows lower temperature cavity operation at the expense of greater flow rates to achieve the same productivity.

In this example, the solution mine product is sodium sesquicarbonate and soda ash produced by the monohydrate process. The recovered solution is first cooled and evaporated to produce salable sodium sesquicarbonate which is in part converted and sold as light soda ash. The solution recovered from the sodium sesquicarbonate process feeds a monohydrate plant producing salable soda ash. The solution recovered from the monohydrate process is hot and ready to return to the mining cavity with minor additional heating.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/ or equivalent structures, functions, ranges or steps are disclosed herein, and without intending to publicly dedicate any patentable subject matter.

We claim:

1. A method of constructing an underground configuration comprising:
    a) drilling at least one access well; and
    b) drilling at least two lateral boreholes, wherein the at least two lateral boreholes are directly communicating with each other and wherein at least one of the lateral boreholes is connected to the at least one access well;
wherein construction of said underground configuration allows for and facilitates the management of fluid flow in the lateral boreholes, wherein controlled measurable fluid flow is maintained through the lateral boreholes by the use of components or methods selected from the group consisting of inlet fluid pressure, packers, plugs, casing, cement, perforations, specific gravity gradients, artificial leach barriers, natural intrabed barriers, natural interbed barriers, flow reversal, adjustable tubing controlled injection, adjustable tubing controlled recovery points and combinations thereof.

2. The method of claim 1, wherein the underground configuration is a water well.

3. The method of claim 1, wherein the underground configuration is selected from the group consisting of an evaporite ore mine, oil shale mine, a tar sand mine, and a coal mine.

4. The method of claim 1, wherein the underground configuration is a containment barrier for underground contaminants.

5. The method of claim 1, wherein the underground configuration is a subterranean storage facility.

6. The method of claim 5, wherein the subterranean storage facility is for a gas.

7. The method of claim 6, wherein the gas is natural gas.

8. The method of claim 5, wherein the subterranean storage facility is for a liquid.

9. The method of claim 1, wherein the underground configuration is an evaporite ore mine.

* * * * *